US008021301B2

(12) United States Patent
Satoh

(10) Patent No.: US 8,021,301 B2
(45) Date of Patent: Sep. 20, 2011

(54) ULTRASONIC IMAGE PROCESSING APPARATUS, ULTRASONIC IMAGE PROCESSING METHOD AND ULTRASONIC IMAGE PROCESSING PROGRAM

(75) Inventor: Yoshiaki Satoh, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 2034 days.

(21) Appl. No.: 11/018,043

(22) Filed: Dec. 22, 2004

(65) Prior Publication Data
US 2005/0143655 A1 Jun. 30, 2005

(30) Foreign Application Priority Data

Dec. 26, 2003 (JP) ................................. 2003-433272
Dec. 26, 2003 (JP) ................................. 2003-433364

(51) Int. Cl.
*A61B 8/00* (2006.01)
*G06T 5/00* (2006.01)
(52) U.S. Cl. ......... 600/437; 600/454; 600/468; 382/128
(58) Field of Classification Search .................. 600/454, 600/458, 407, 468; 382/128
See application file for complete search history.

(56) References Cited

U.S. PATENT DOCUMENTS

| 4,951,676 A * | 8/1990 | Collet-Billon ................. 600/437 |
| 5,409,007 A * | 4/1995 | Saunders et al. .............. 600/447 |
| 5,424,742 A * | 6/1995 | Long et al. ................... 342/25 C |
| 5,522,392 A * | 6/1996 | Suorsa et al. ................. 600/454 |
| 6,102,864 A * | 8/2000 | Hatfield et al. ............... 600/454 |
| 6,181,810 B1 * | 1/2001 | Zhang et al. .................. 382/128 |
| 6,208,763 B1 * | 3/2001 | Avinash ........................ 382/254 |
| 6,689,064 B2 * | 2/2004 | Hager et al. .................. 600/454 |

FOREIGN PATENT DOCUMENTS

| JP | 07051270 A | 2/1995 |
| JP | 10-40371 A | 2/1998 |
| JP | 10-84286 A | 3/1998 |
| JP | 11197151 A | 7/1999 |
| JP | 2000040154 A | 2/2000 |
| JP | 2001170049 A | 6/2001 |
| JP | 2001340338 A | 12/2001 |
| JP | 2002052026 A | 2/2002 |
| JP | 2002157593 A | 5/2002 |
| WO | WO 00/20885 A1 | 4/2000 |

OTHER PUBLICATIONS

Masayoshi Tsubai, et al., "Control of Variable Structuring Element on Adaptive Mathematical Morphology for Boundary Enhancement of Ultrasound Images", IEICE Transactions D-II, Vo. J86-D-II, No. 6, pp. 895-907, Jun. 2003, The Institute of Electronics, Information and Communication Engineers.
Japanese Office Action corresponding to Japanese Patent Application No. 2004-369638, dated May 31, 2010.

* cited by examiner

*Primary Examiner* — Long V. Le
*Assistant Examiner* — Helene Bor
(74) *Attorney, Agent, or Firm* — Sughrue Mion, PLLC

(57) ABSTRACT

An ultrasonic image processing apparatus in which image quality of ultrasonic images can be improved by performing image processing that utilizes image characteristics of the original image. The ultrasonic image processing apparatus processes image data generated based on a signal obtained by scanning an object to be inspected by using an ultrasonic beam and respectively representing pixel values of the plurality of pixels within the ultrasonic image. The ultrasonic image processing apparatus includes a morphology processing unit for processing the image data to reduce speckles appearing in the ultrasonic image, and a DSC for converting a scan format of the image data processed by the morphology processing unit.

17 Claims, 16 Drawing Sheets

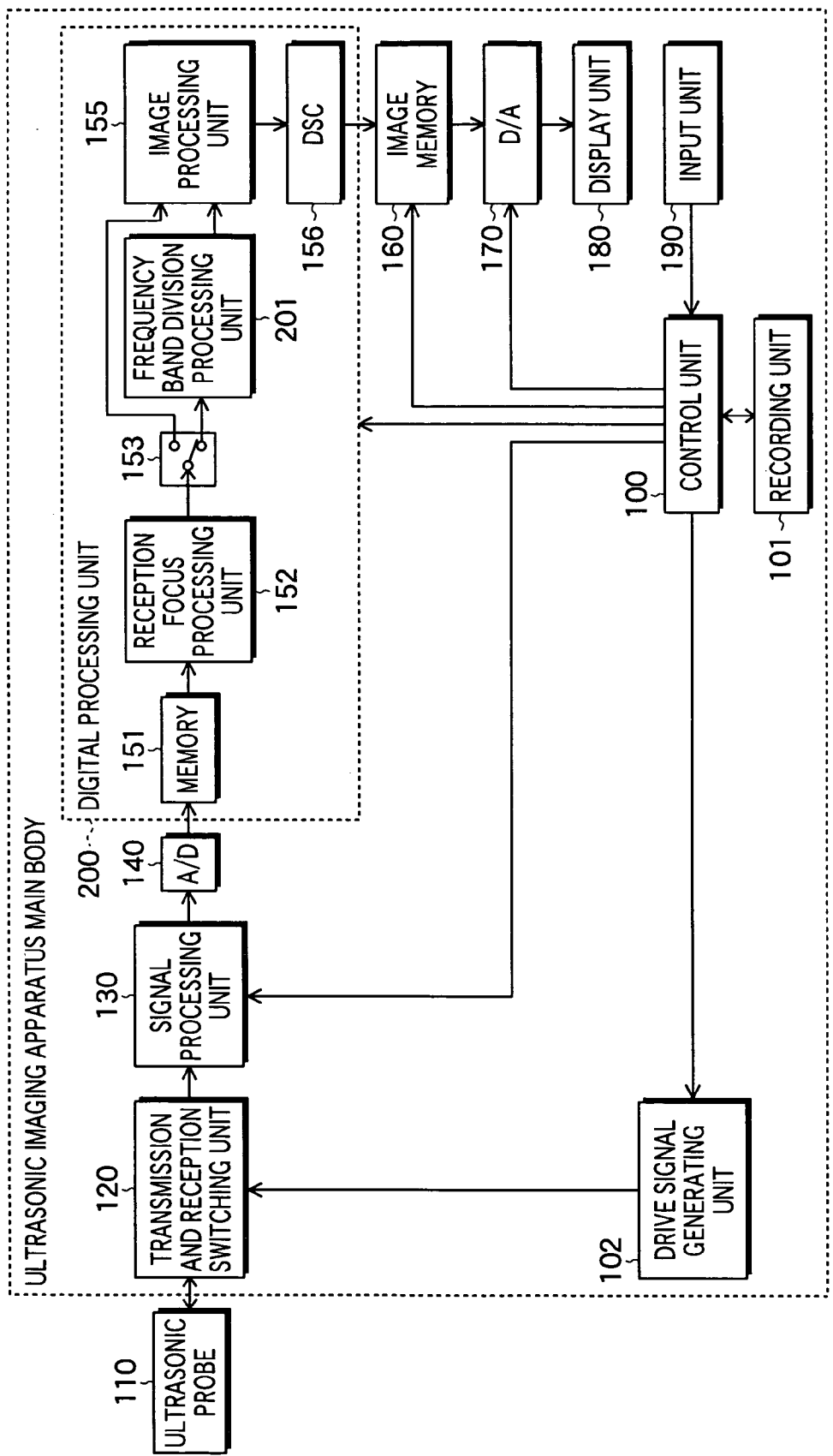

| 0.85 | 0.85 | 0.85 | 0.85 | 0.85 | 0.85 | 0.85 |
|------|------|------|------|------|------|------|
| 0.85 | 0.90 | 0.90 | 0.90 | 0.90 | 0.90 | 0.85 |
| 0.85 | 0.90 | 0.95 | 0.95 | 0.95 | 0.90 | 0.85 |
| 0.85 | 0.90 | 0.95 | 1.00 | 0.95 | 0.90 | 0.85 |
| 0.85 | 0.90 | 0.95 | 0.95 | 0.95 | 0.90 | 0.85 |
| 0.85 | 0.90 | 0.90 | 0.90 | 0.90 | 0.90 | 0.85 |
| 0.85 | 0.85 | 0.85 | 0.85 | 0.85 | 0.85 | 0.85 |

| 1.18 | 1.18 | 1.18 | 1.18 | 1.18 | 1.18 | 1.18 |
|------|------|------|------|------|------|------|
| 1.18 | 1.11 | 1.11 | 1.11 | 1.11 | 1.11 | 1.18 |
| 1.18 | 1.11 | 1.05 | 1.05 | 1.05 | 1.11 | 1.18 |
| 1.18 | 1.11 | 1.05 | 1.00 | 1.05 | 1.11 | 1.18 |
| 1.18 | 1.11 | 1.05 | 1.05 | 1.05 | 1.11 | 1.18 |
| 1.18 | 1.11 | 1.11 | 1.11 | 1.11 | 1.11 | 1.18 |
| 1.18 | 1.18 | 1.18 | 1.18 | 1.18 | 1.18 | 1.18 |

$ek(0, 0)$, $ek(x, y)$

ULTRASONIC IMAGE PROCESSING APPARATUS, ULTRASONIC IMAGE PROCESSING METHOD AND ULTRASONIC IMAGE PROCESSING PROGRAM

BACKGROUND OF THE INVENTION

1. Field of the Invention

The present invention relates to an ultrasonic image processing apparatus for processing ultrasonic image signals obtained by transmitting ultrasonic waves and receiving ultrasonic echoes, an ultrasonic image processing method to be used therein, and an ultrasonic image processing program for allowing a CPU to execute such ultrasonic image processing.

2. Description of a Related Art

In medical fields, various imaging technologies have been developed in order to observe the interior of an object to be inspected and to make diagnoses. Especially, ultrasonic imaging for obtaining interior information of the object by transmitting and receiving ultrasonic waves enables image observation in real time and provides no exposure to radiation unlike other medical image technologies such as X-ray photography or RI (radio isotope) scintillation camera. Accordingly, ultrasonic imaging is utilized as an imaging technology at a high level of safety in a wide range of departments including not only fetal diagnosis in obstetrics but also gynecology, circulatory system, digestive system, etc.

The ultrasonic imaging is an imaging technology for generating images according to the following principle. Ultrasonic waves are reflected at the interface between regions having different acoustic impedances like the interface between structures. Therefore, by transmitting an ultrasonic beam into an object to be inspected such as a human body, receiving ultrasonic echoes generated within the object, and obtaining reflection points where the ultrasonic echoes are generated or reflection intensity, the outline of a structure (e.g., internal organs, diseased tissues, or the like) existing within the object can be extracted.

By the way, in order to generate ultrasonic images suitable for medical diagnosis, it is necessary to perform various kinds of image processing on the original image data acquired by receiving ultrasonic echoes. For example, there is generally performed such image processing as processing by DSC (digital scan converter) for converting a scan format from image data (sound ray data) in scan space (sound ray space) of the ultrasonic beam for scanning the object into image data in physical space, combining of plural frame images, sharpness enhancement processing (edge enhancement processing), graininess suppression processing (smoothing processing), or the like. International Application Publication WO00/20885 discloses an ultrasonic diagnostic imaging system for generating display images by correcting displacement between component images and then combining them. Further, Japanese Patent Application Publication JP-A-10-40371 discloses an image processing apparatus provided with a filter characteristic determining unit for calculating a local characteristic amount with respect to each pixel of interest in image data of an original image and determining characteristics of local filters based on the calculated characteristic amounts to output them.

Especially, in an ultrasonic image in which an object having an ununiform structure like a living body is imaged, there appears a pattern having bright parts and/or dark parts are scattered. Such a pattern is called as a speckle pattern, and the speckle pattern is generated, for example, by interference between ultrasonic echoes reflected from ununiform tissues existing within an internal organ or the like. The speckle pattern acts as a kind of noise, and thereby, the demonstrated outline of the structure or the like often becomes unclear. Accordingly, in order to generate an image suitable for medical diagnosis from such an original image, it is necessary to perform image processing including sharpness enhancement processing and graininess suppression processing on the acquired original image data. As such processing, specifically, averaging processing, median filtering processing, hysteresis smoothing processing, morphology processing and so on are known.

The morphology processing is image processing using elements called as structure elements relating to movement of the image and operations called as Mincowski sum and Mincowski difference. The Mincowski sum and Mincowski difference with functions "f" and "g" are defined by equations (1) and (2), respectively. In the following equations (1) to (4), "F" and "G" represent domains of "f" and "g", respectively.

Mincowski sum: (1)
$$(f \oplus g)(x) = \max_{\substack{x-u \in F \\ u \in G}} \{f(x-u) + g(u)\}$$

Mincowski difference: (2)
$$(f \ominus g)(x) = \min_{u \in G} \{f(x-u) - g(u)\}$$

The morphology processing includes four basic processing called as dilation, erosion, opening, and closing. The basic processing with respect to image function "f" by using structure element "$g^s$" is determined by the following equations (3) to (6). In the equations (3) to (6), the function "g" is symmetric with respect to the point of origin.

Dilation: (3)
$$(f \oplus g^s)(x) = \max_{\substack{x+u \in F \\ u \in G}} \{f(x+u) + g(u)\}$$

Erosion: (4)
$$(f \ominus g^s)(x) = \min_{x \in G} \{f(x+u) - g(u)\}$$

Opening:

$$f_g = (f \ominus g^s) \oplus g \qquad (5)$$

Closing:

$$f^g = (f \oplus g^s) \ominus g \qquad (6)$$

As shown in the equation (3), the dilation is processing of obtaining Mincowski sum of image function "f" moved by the structure element "$g^s$", and, intuitively, has a function of expanding the original image by searching for the maximum value within the mask defined based on the structure element and replacing the pixel value at the center of the mask area with the maximum value. Further, as shown in the equation (4), the erosion is processing of obtaining Mincowski difference of image function "f" moved by the structure element "$g^s$", and, intuitively, has a function of contracting the original image by searching for the minimum value within the mask and replacing the pixel value at the center of the mask area with the minimum value. Furthermore, the opening is processing of performing dilation after erosion, and has a function of removing convex portions, for example. Further, the closing is processing of performing erosion after dilation, and has a function of plugging concave portions, for example.

It is under study to extracting a structure from an ultrasonic image or improving the image quality by applying such morphology processing to ultrasonic image processing. Japanese Patent Application Publication JP-A-10-84286 discloses that edge lines are extracted by performing morphology processing as preprocessing in an apparatus for coding and decoding time-series data in order to make diagnoses efficiently. Further, Tsubai et al., "Control of Variable Structuring Element on Adaptive Mathematical Morphology for Boundary Enhancement of Ultrasound Images", IEICE Transactions D-II, Vol. J86-D-II No. 6, pp. 895-907, June 2003 discloses that interface enhancement and speckle reduction are simultaneously performed by controlling the structure elements in the morphology processing.

By the way, generally in ultrasonic image processing, conversion of scan format and so on are performed on the original image data. However, by such conversion of scan format, image characteristics (e.g., frequency bands and so on) of the original image data are sometimes changed or lost. Accordingly, in the subsequent image processing like smoothing processing and edge enhancement processing including the morphology processing, it often occurs that characteristics of the original image data cannot be utilized. Further, also in the morphology processing, the following problem occurs. That is, the morphology processing has a function of smoothing a pattern smaller than the mask size which is used as a reference, and therefore, artifacts (virtual images) due to the mask size, i.e., the structure element are sometimes generated.

SUMMARY OF THE INVENTION

The present invention is achieved in view of the above-described problems. The first purpose of the present invention is to improve image quality of an ultrasonic image by performing image processing that utilizes image characteristics of the original image on the ultrasonic image obtained by transmitting and receiving ultrasonic waves. Further, the second purpose of the present invention is to provide an image processing method and so on by which artifacts are hardly generated when reduction of speckles is processed on the ultrasonic image obtained by transmitting and receiving ultrasonic waves.

In order to solve the above-described problems, an ultrasonic image processing apparatus according to the first aspect of the present invention is an ultrasonic image processing apparatus for processing a plurality of signals generated based on a signal obtained by scanning an object to be inspected by using an ultrasonic beam and respectively representing pixel values of a plurality of pixels within an ultrasonic image, and the apparatus includes: image processing means for processing the plurality of signals to reduce speckles appearing in the ultrasonic image; and scan converting means for converting a scan format of the plurality of signals processed by the image processing means.

Further, an ultrasonic image processing apparatus according to the second aspect of the present invention is an ultrasonic image processing apparatus for processing a plurality of signals generated based on a signal obtained by scanning an object to be inspected by using an ultrasonic beam and respectively representing pixel values of a plurality of pixels within an ultrasonic image, and the apparatus includes: image processing means for performing mask processing on an image represented by the plurality of signals; and scan converting means for converting a scan format of the plurality of signals subjected to the mask processing by the image processing means.

Furthermore, an ultrasonic image processing apparatus according to the third aspect of the present invention is an ultrasonic image processing apparatus for processing a plurality of signals generated based on a signal obtained by scanning an object to be inspected by using an ultrasonic beam and respectively representing pixel values of a plurality of pixels within an ultrasonic image, and the apparatus includes: scan converting means for converting a scan format of the plurality of signals; and image signal processing means for performing first signal processing on the plurality of signals the scan format of which is converted by the scan converting means to multiply the pixel values of a plurality of pixels within a mask area determined based on a structure element in morphology processing by a first group of weighting factors set depending on positions within the mask area, respectively, and convert a pixel value at a center of the mask area into a maximum value of the pixel values multiplied by the first group of weighting factors while moving the mask area, and performing second signal processing on the plurality of signals subjected to the first signal processing to multiply pixel values of a plurality of pixels within a mask area determined based on a structure element in morphology processing by a second group of weighting factors set depending on positions within the mask area, respectively, and convert a pixel value at a center of the mask area into a minimum value of the pixel values multiplied by the second group of weighting factors while moving the mask area.

An ultrasonic image processing method according to the first aspect of the present invention is an ultrasonic image processing method of processing a plurality of signals generated based on a signal obtained by scanning an object to be inspected by using an ultrasonic beam and respectively representing pixel values of a plurality of pixels within an ultrasonic image, and the method includes the steps of: (a) processing the plurality of signals to reduce speckles appearing in the ultrasonic image; and (b) converting a scan format of the plurality of signals processed at step (a).

Further, an ultrasonic image processing method according to the second aspect of the present invention is an ultrasonic image processing method of processing a plurality of signals generated based on a signal obtained by scanning an object to be inspected by using an ultrasonic beam and respectively representing pixel values of a plurality of pixels within an ultrasonic image, and the method includes the steps of: (a) performing mask processing on an image represented by the plurality of signals; and (b) converting a scan format of the plurality of signals subjected to the mask processing at step (a).

Furthermore, an ultrasonic image processing method according to the third aspect of the present invention is an ultrasonic image processing method of processing a plurality of signals generated based on a signal obtained by scanning an object to be inspected by using an ultrasonic beam and respectively representing pixel values of a plurality of pixels within an ultrasonic image, and the method includes the steps of: (a) converting a scan format of the plurality of signals; (b) performing first signal processing on the plurality of signals the scan format of which is converted at step (a) to multiply pixel values of a plurality of pixels within a mask area determined based on a structure element in morphology processing by a first group of weighting factors set depending on positions within the mask area, respectively, and convert a pixel value at a center of the mask area into a maximum value of the pixel values multiplied by the first group of weighting factors while moving the mask area; and (c) performing second signal processing on the plurality of signals subjected to the first signal processing to multiply pixel values of a plurality of pixels within a mask area determined based on a structure element in morphology processing by a second group of weighting factors set depending on positions within the mask area, respectively, and convert a pixel value at a center of the mask area into a minimum value of the pixel values multiplied by the second group of weighting factors while moving the mask area.

An ultrasonic image processing program according to the first aspect of the present invention is an ultrasonic image processing program for processing a plurality of signals generated based on a signal obtained by scanning an object to be inspected by using an ultrasonic beam and respectively representing pixel values of a plurality of pixels within an ultrasonic image, and the program allows a CPU to execute the procedures of: (a) processing the plurality of signals to reduce speckles appearing in the ultrasonic image; and (b) converting a scan format of the plurality of signals processed at procedure (a).

Further, an ultrasonic image processing program according to the second aspect of the present invention is an ultrasonic image processing program for processing a plurality of signals generated based on a signal obtained by scanning an object to be inspected by using an ultrasonic beam and respectively representing pixel values of a plurality of pixels within an ultrasonic image, and the program allows a CPU to execute the procedures of: (a) performing mask processing on an image represented by the plurality of signals; and (b) converting a scan format of the plurality of signals subjected to the mask processing at procedure (a).

Furthermore, an ultrasonic image processing program according to the third aspect of the present invention is an ultrasonic image processing program for processing a plurality of signals generated based on a signal obtained by scanning an object to be inspected by using an ultrasonic beam and respectively representing pixel values of a plurality of pixels within an ultrasonic image, and the program allows a CPU to execute the procedures of: (a) converting a scan format of the plurality of signals; (b) performing first signal processing on the plurality of signals the scan format of which is converted at procedure (a) to multiply pixel values of a plurality of pixels within a mask area determined based on a structure element in morphology processing by a first group of weighting factors set depending on positions within the mask area, respectively, and convert a pixel value at a center of the mask area into a maximum value of the pixel values multiplied by the first group of weighting factors while moving the mask area; and (c) performing second signal processing on the plurality of signals subjected to the first signal processing to multiply pixel values of a plurality of pixels within a mask area determined based on a structure element in morphology processing by a second group of weighting factors set depending on positions within the mask area, respectively, and convert a pixel value at a center of the mask area into a minimum value of the pixel values multiplied by the second group of weighting factors while moving the mask area.

BRIEF DESCRIPTION OF THE DRAWINGS

FIG. 5 is a block diagram showing the constitution of an ultrasonic imaging apparatus according to the second embodiment of the present invention;

FIGS. 13A and 13B show examples of dilation factors and erosion factors used in the fourth embodiment of the present invention;

DESCRIPTION OF THE PREFERRED EMBODIMENTS

Figure 1:
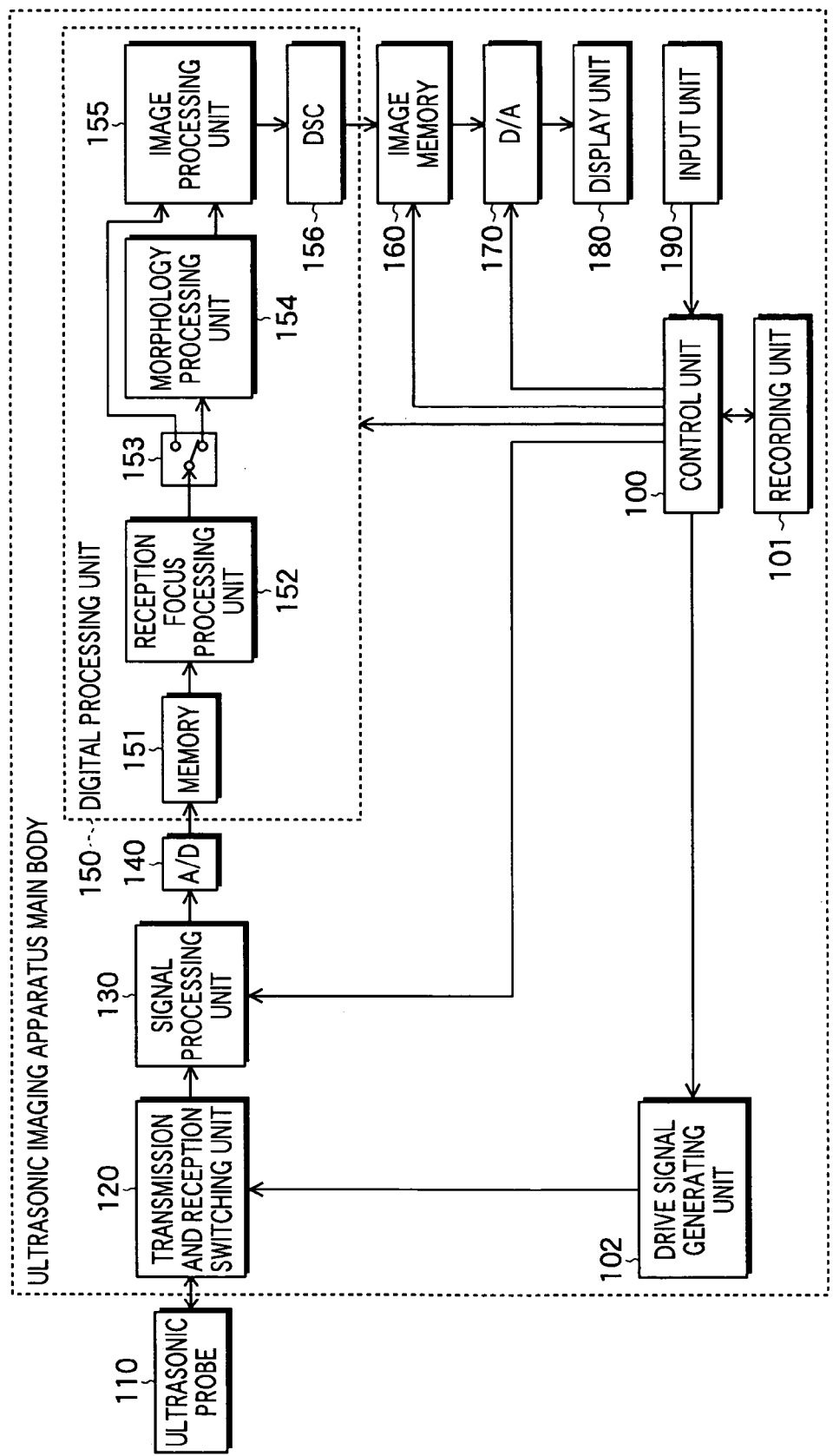
FIG. 1 is a block diagram showing the constitution of an ultrasonic imaging apparatus according to the first embodiment of the present invention.

Hereinafter, preferred embodiments of the present invention will be described in detail by referring to the drawings. The same component will be assigned with the same reference number and the description thereof will be omitted.

FIG. 1 is a block diagram showing the constitution of an ultrasonic imaging apparatus according to the first embodiment of the present invention. This ultrasonic imaging apparatus includes an ultrasonic probe 110 for transmitting and receiving ultrasonic waves and an ultrasonic imaging apparatus main body for controlling the transmission and reception of ultrasonic waves and generating ultrasonic images based on acquired ultrasonic wave detection signals.

The ultrasonic probe 110 includes an ultrasonic transducer array in which plural ultrasonic transducers are arranged. Each ultrasonic transducer is fabricated by forming electrodes on both ends of a material having a piezoelectric property (piezoelectric material) such as a piezoelectric ceramic represented by PZT (Pb(lead) zirconate titanate) or a polymeric piezoelectric element represented by PVDF (polyvinylidene difluoride). When a voltage is applied to the electrodes of such an ultrasonic transducer by sending pulse electric signals or continuous wave electric signals, the piezoelectric material expands and contracts to generate ultrasonic waves. Accordingly, by electronically controlling plural ultrasonic transducers, pulse or continuous ultrasonic waves are generated from the ultrasonic transducers. Thereby, an ultrasonic beam is formed by combining those ultrasonic waves and the object is electronically scanned. Further, the plural ultrasonic transducers expand and contract by receiving the propagating ultrasonic waves and generate electric signals. These electric signals are outputted as detection signals of the ultrasonic waves.

Such an ultrasonic probe 110 is connected to the ultrasonic imaging apparatus main body via a cable.

As the ultrasonic probe 110, a probe including a linear array in which plural ultrasonic transducers are arranged in one-dimensional manner, a probe including a convex array in which plural ultrasonic transducers are arranged on a convex surface, or the like can be used. Further, a probe including a two-dimensional array in which plural ultrasonic transducers are arranged in two-dimensional manner may be used. In this case, ultrasonic images on plural different sections can be obtained without mechanically moving the ultrasonic probe.

Alternatively, as the ultrasonic probe 110, a probe within body cavity to be inserted into the object for performing ultrasonic imaging may be used. As a probe within body cavity, an ultrasonic probe to be used by being inserted into a treatment tool insertion hole of an endoscope, or, as shown in FIG. 2, an ultrasonic endoscope integrated with an endoscope is known.

Figure 2:
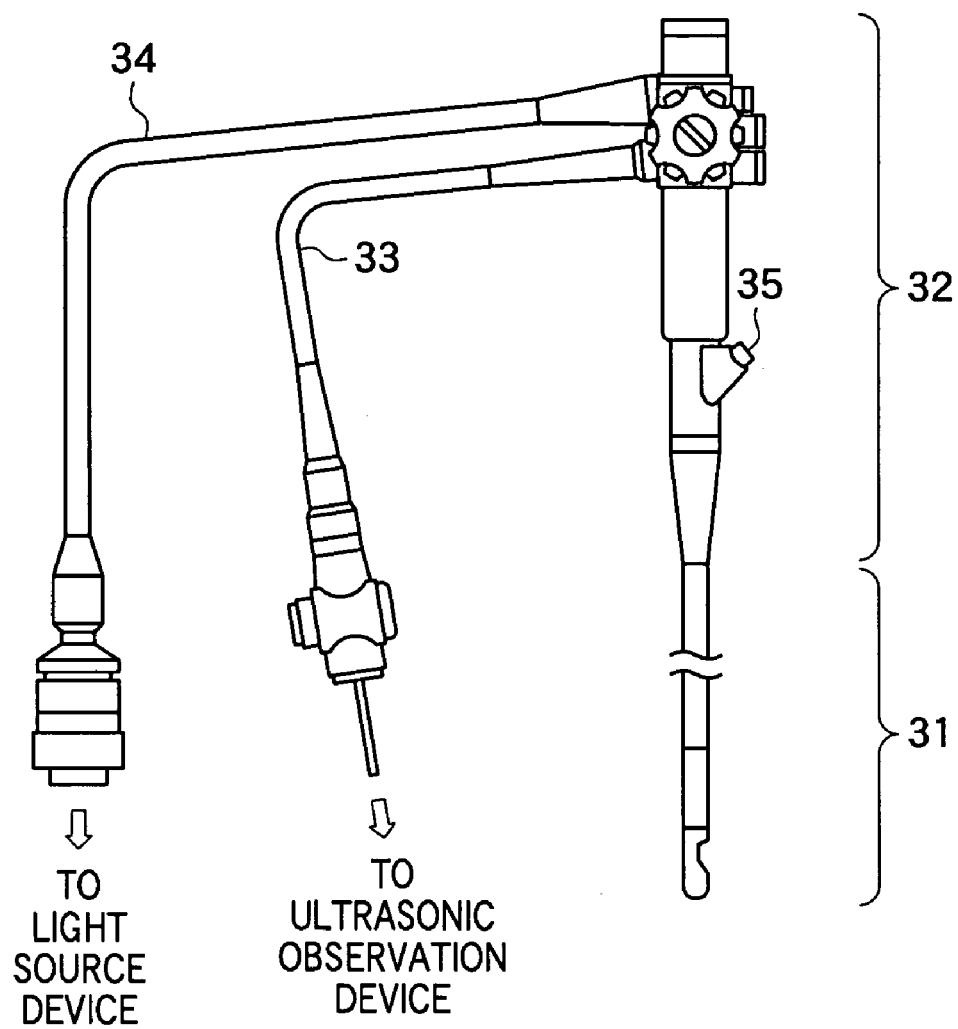
FIG. 2 is a schematic diagram showing the appearance of an ultrasonic endoscope.

The ultrasonic endoscope 30 as shown in FIG. 2 includes an insertion part 31, an operation part, a connecting cord 33, and a universal cord 34. The insertion part 31 is formed of a flexible elongated tube so as to be inserted into the body of a patient. The operation part 32 provided at the base end of the insertion part 31 is connected to an ultrasonic observation device via the connecting cord 33, and connected to a light source device via the universal cord 34. Further, in the operation part 32, there is provided a treatment tool insertion hole 35 into which various treatment tools are inserted toward the tip end of the insertion part 31.

In the insertion part 31 of the ultrasonic endoscope 30, an illumination window and an observation window are provided. An illumination lens for outputting illumination light supplied via a light guide from the light source device is attached to the illumination window. These form an illumination optical system. Further, an objective lens is attached to the observation window, and, in a position where the objective lens forms an image, an input end of an image guide or solid image pickup device such as a CCD camera is disposed. These form an observation optical system. Furthermore, ultrasonic transducers for transmitting ultrasonic waves toward inside of the object and receiving ultrasonic echoes generated within the object are provided on the tip end of the insertion part 31.

In such a probe within body cavity, ultrasonic imaging is performed in accordance with a radial scan method. The radial scan method includes a mechanical radial scan method of transmitting and receiving ultrasonic waves while rotating the probe and generating an image signal based on the ultrasonic signals in synchronization with the rotation, and an electronic radial scan method of scanning the object by electrically controlling plural vibrators arranged in a circular form. According to such scan method, 360-degree region surrounding the probe can be displayed at a time. Alternatively, as a probe within body cavity according to a scan method other than the radial scan, one provided with a convex array at the tip end thereof is known. In the case of using a convex array, a wide viewing angle can be obtained.

Referring to FIG. 1 again, the ultrasonic imaging apparatus main body includes a control unit 100, a recording unit 101, a drive signal generating unit 102, a transmission and reception switching unit 120, a signal processing unit 130, an A/D converter 140, a digital processing unit 150, an image memory 160, D/A converter 170, a display unit 180, and an input unit 190. The control unit 100 includes a CPU and software and controls the respective units of the ultrasonic imaging apparatus.

The recording unit 101 controls a recording medium for recording basic programs which allows the CPU included in the ultrasonic imaging apparatus to perform operation, programs (software) to be used for various kinds of processing, information used for those processing, etc. As the recording medium, other than the built-in hard disk, an external hard disk, a flexible disk, an MO, an MT, a RAM, CD-ROM, DVD-ROM and so on may be used.

The drive signal generating unit 102 includes plural pulsers corresponding to the plural ultrasonic transducers included in the ultrasonic probe 110. Each pulser generates a drive signal with predetermined timing under control of the control unit 100. Thereby, ultrasonic waves are generated from the plural ultrasonic transducers with predetermined time difference, respectively.

The transmission and reception switching unit 120 switches between input of the drive signals generated in the drive signal generating unit 102 to the ultrasonic probe 110 and load of detection signals in the signal processing unit 130, which will be described later, with predetermined timing in accordance with the control of the control unit 100. Thus, by limiting the time period for reading detection signals, ultrasonic echo signals reflected from a specific depth of the object are detected.

The signal processing unit 130 includes plural channels corresponding to the plural ultrasonic transducers, respectively. Each of these channels loads a detection signal outputted from the corresponding ultrasonic transducer with predetermined timing and performs signal processing such as amplification, Nyquist filter processing and so on.

The A/D converter 140 generates detection data by converting an analog signal processed in the signal processing unit 130 into a digital signal.

The digital processing unit 150 includes a memory 151, a reception focus processing unit 152, a switch 153, a morphology processing unit 154, an image processing unit 155, and a digital scan converter (DSC) 156. The memory 151 includes line memories corresponding to plural channels of the signal processing unit 130, respectively, for storing the generated detection data with respect to each line in chronological order. Alternatively, the memory 151 may be formed by a cine memory for storing moving image data for a specific period.

The reception focus processing unit 152 performs reception focus processing by providing delays on plural detection data stored in the memory 151 and adding them to each other. Thereby, sound ray data representing a reception beam having the focal point narrowed in the predetermined sound ray direction is generated. Further, detection is performed with respect to a waveform represented by the sound ray data so as to obtain image data. The values of this image data represent pixel values of plural pixels that form the ultrasonic image.

The switch 153 switches whether speckle reduction processing in the morphology processing unit 154 is performed or not with respect to the generated sound ray data. The switch 153 is controlled in accordance with instructions inputted by the user by using the input unit 190, which will be described later.

The morphology processing unit 154 generates image data in which speckles appearing in the ultrasonic image are reduced by performing the morphology processing on the image data generated in the reception focus processing unit 152. The morphology processing will be described later in detail.

The image processing unit 155 performs image processing such as STC (sensitivity time control) for correcting distance attenuation, linear gradation processing including gain adjustment and contrast adjustment, non-linear gradation processing including γ correction, etc. on the inputted image data.

The DSC 156 generates image data for display by converting the scan format from image data in the scanning space of the ultrasonic beam to image data in physical space. That is, the DSC 156 performs resampling in correspondence with an image display range, performs coordinate conversion into a display mode corresponding to the scan method of ultrasonic waves, and performs interpolation. For example, interpolation processing for generating a linear image is performed on the image data obtained by the linear scan. Further, polar coordinate conversion and interpolation processing are performed on image data obtained by sector scan, convex scan, or radial scan.

The image memory 160 stores image data for display in a format in which raster scan can be performed, for example. Further, the D/A converter 170 converts image data read from the image memory 160 into analog signals and outputs them.

The display unit 180 is a CRT display or an LED display of raster scan type, for example, and displays ultrasonic images based on the D/A converted image signals.

The input unit 190 is an input device to be used when various instructions or information to the ultrasonic imaging apparatus main body. The input unit 190 may be formed by an adjustment console including an adjustment knob, input button, a keyboard, touch panel, etc., or a pointing device such as an external keyboard, mouse, etc.

In the embodiment, the reception focus processing unit 152, the switch 153, the morphology processing unit 154, the image processing unit 155, and the DSC 156 are formed by a CPU and software. However, these respective units 152 to 156 may be formed by using analog circuits or digital circuits. For example, the STC, gain adjustment, and contrast adjustment performed in the image processing unit 155 may be performed on analog signals by providing analog circuits in the signal processing unit. Further, γ correction of the image processing in the image processing unit 155 may be performed after conversion of the scan format in the DSC 156.

Furthermore, the digital processing unit 150 including the memory 151 to DSC 156 may be formed by using a personal computer (PC). In this case, the data to be processed in the digital processing unit 150 may be inputted directly via the ultrasonic probe 110, the signal processing unit 130, and the A/D converter 140, or inputted via a network or recording medium.

Next, the operation of the ultrasonic imaging apparatus as shown in FIG. 1 will be described.

When the user starts ultrasonic imaging, under the control by the control unit 100, an ultrasonic beam having the set frequency is transmitted from the ultrasonic probe 110, the object is scanned by the scan method such as linear scan, sector scan, convex scan, radial scan, or the like. This ultrasonic beam is reflected by a reflector existing within the object, and plural ultrasonic echoes are received by the ultrasonic probe 110. The received ultrasonic echoes are converted into electric signals in the ultrasonic probe 110, and inputted as detection signals to the ultrasonic imaging apparatus main body.

The plural detection signals inputted to the ultrasonic imaging apparatus main body are subjected to predetermined imaging signal processing in the signal processing unit 130. Thereby, wide band detection signals from which unwanted frequency components are eliminated are obtained. These detection signals are A/D converted, once stored in the memory 151, and then, subjected to reception focus processing in the reception focus processing unit 152 so as to generate sound ray data. Image data is obtained on the basis of thus generated sound ray data and subjected to morphology processing in the morphology processing unit 154. Then, the image data that has been subjected to speckle reduction processing by the morphology processing is subjected to predetermined image processing such as gradation processing in the image processing unit 155, and subsequently, the scan format thereof is converted in the DSC 156 in accordance with the scan method. Further, the image data the scan format of which has been converted is once stored in the image memory 160, and then, D/A converted and outputted. Thereby, the ultrasonic image is displayed on a screen of the display unit 180.

Figure 3A:
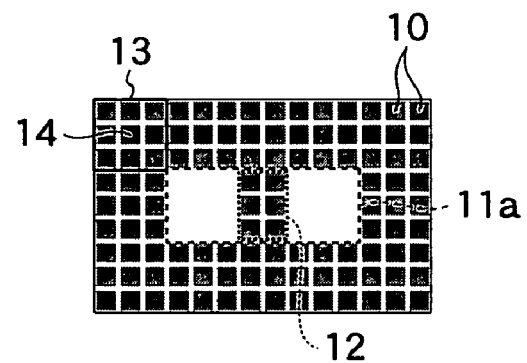
FIGS. 3A-3C are diagrams for explanation of morphology processing.
Figure 3B:
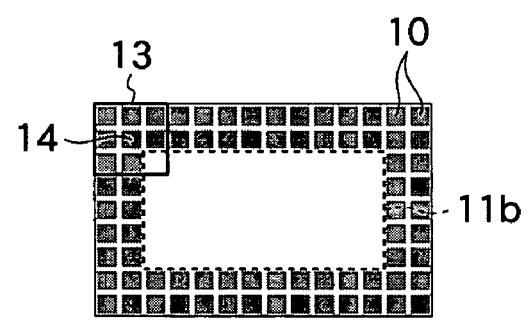
Figure 3C:
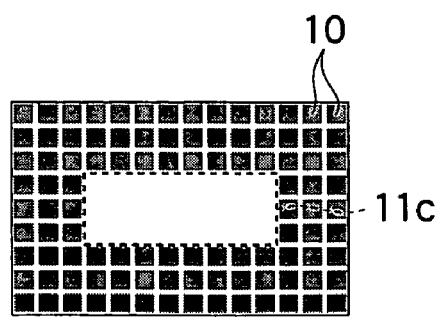

The morphology processing performed in the morphology processing unit 154 will be described by referring to FIGS. 3A-3C and 4A and 4B in detail. FIGS. 3A-3C are diagrams for explanation of the morphology processing.

FIGS. 3A-3C schematically show an ultrasonic image formed by the plural pixels 10. In FIG. 3A, a high brightness area 11a divided by a low brightness area 12 is shown. To connect the divided high brightness area 11a, dilation as a basic operation of the morphology processing represented by the following equation (7) is performed on the ultrasonic image. That is, the maximum value is extracted from pixels within the mask area 13 with a pixel of interest 14 as the center thereof, and processing of converting the pixel value of the pixel of interest 14 into the maximum value is performed with respect to each of the plural pixels 10.

$$g = \max_{x,y \in G} \{Y(x, y)\} \tag{7}$$

Where "g" represents a set of pixel values representing an image obtained by dilation, "Y" represents a pixel value of the original image, "G" represents a mask determined based on the structure element, and (x,y) are coordinates within the mask area. Thereby, as shown in FIG. 3B, high brightness area expands and the low brightness area that had divided the high brightness area is deleted.

Then, erosion represented by the following equation (8) is performed on the ultrasonic image as shown in FIG. 3B. That is, the minimum value is extracted from the pixels within the mask area 13 with a pixel of interest 14 as the center thereof, and processing of converting the pixel value of the pixel of interest 14 into the minimum value is performed with respect to each of the plural pixels 10 as shown in FIG. 3B.

$$f = \min_{x,y \in G} \{g(x, y)\} \tag{8}$$

Where "f" represents a set of pixel values representing an image obtained by erosion. Thereby, as shown in FIG. 3C, a high brightness area 11b contracts and returns into the original size. Thus, the high brightness area 11a that had been divided due to the influence of the speckles can be connected like the high brightness area 11c.

In the ultrasonic imaging apparatus according to the embodiment, unlike the general ultrasonic imaging apparatus, morphology processing is performed on the image data before scan conversion by the DSC. In the case where the order of the processing is changed, the following advantages are provided.

Figure 4A:
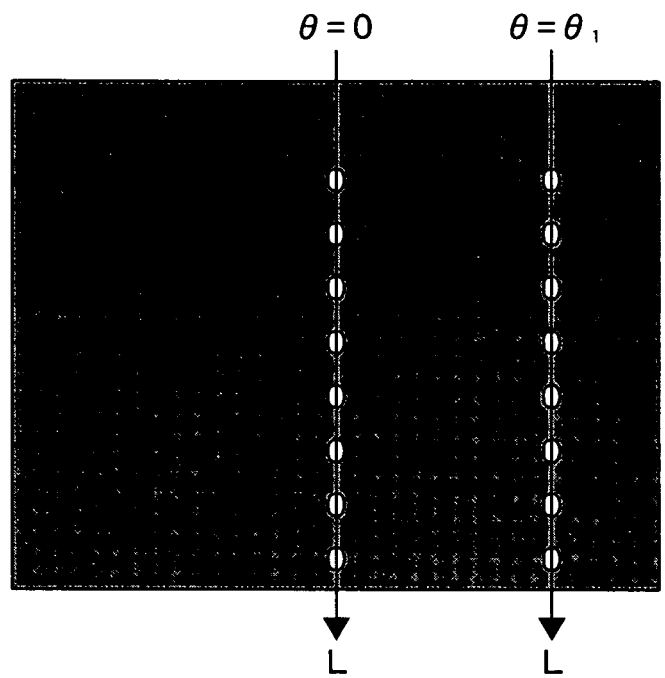
FIGS. 4A and 4B are diagrams for explanation of the influence on a speckle pattern by coordinate conversion.
Figure 4B:
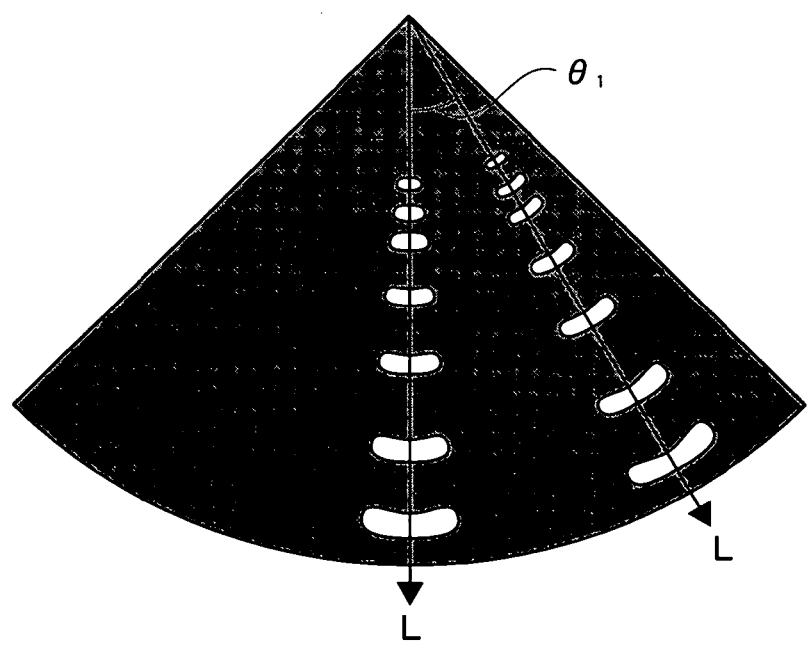

As shown in FIG. 4A, in the image data before scan conversion by the DSC, the shape of the speckle pattern is nearly uniform over the entire ultrasonic image. For example, polar coordinate conversion (scan conversion) is performed on such image data in order to obtain a sector image. Here, in the general ultrasonic imaging apparatus, polar coordinate conversion with display angle of 60° or more is often performed. Thereby, as shown in FIG. 4B, the larger the depth L, the horizontally longer the ultrasonic image extends, and the larger the azimuthal angle θ (e.g., θ=θ1), the radially longer the ultrasonic image extends. Accordingly, the speckle pattern appearing in the ultrasonic image deforms into such a shape. That is, the shape of the speckle pattern becomes ununiform due to the influence of the image processing.

When morphology processing is performed on such an ultrasonic image, speckle reduction effect becomes ununiform depending on the position within the ultrasonic image. In order to make the speckle reduction effect uniform, it is conceivable that the mask shape is changed depending on the position within the ultrasonic image, however, operation processing becomes complicated. On the other hand, in the case where the morphology processing is performed on the image data before the deformation of the speckle pattern is produced, i.e., before scan conversion, uniform speckle reduction effect can be obtained over the entire ultrasonic image by simple operation processing.

Further, interpolation processing is performed by the DSC on the image data in order to obtain a linear image, and thereby, the amount of data as a target of operation increases. However, in the case were the speckle reduction processing is performed before performing interpolation processing in a stage where the amount of data is small, the processing can be performed at high speed.

Thus, by changing the order of processing performed on the image data, the effect of the processing can be improved.

However, depending on the user's preferences and parts to be observed, sometimes an ultrasonic image with speckles is easier to be utilized. In such a case, the user inputs an instruction for switching the switch 153 by using the input unit 190 as shown in FIG. 1. Thereby, the image data generated by the reception focus processing is inputted to the image processing unit 155 without having being subjected to the speckle reduction processing, and subjected to processing such as predetermined image processing and scan conversion, and outputted to the display unit 180. Thus, whether the speckle reduction processing is performed or not can be selected by the user, and therefore, a user-desired ultrasonic image can be displayed.

As described above, according to the embodiment, since the morphology processing is performed on the image data before scan conversion, uniform and good speckle reduction effect can be obtained over the entire ultrasonic image. Especially, as shown in FIG. 4B, the preferable effect is recognized in the area in which the speckle pattern deforms significantly due to the influence of scan conversion like in the area in which the scan interval is large (e.g., ends of the ultrasonic image).

Next, an ultrasonic imaging apparatus according to the second embodiment of the present invention will be described. FIG. 5 is a block diagram showing the constitution of the ultrasonic imaging apparatus according to the embodiment. This ultrasonic imaging apparatus includes a digital processing unit 200 as shown in FIG. 5 in place of the digital processing unit 150 as shown in FIG. 1. Other constitution is the same as in the ultrasonic imaging apparatus as shown in FIG. 1.

The digital processing unit 200 as shown in FIG. 5 includes a frequency band division processing unit 201 in place of the morphology processing unit 154 in the digital processing unit 150 as shown in FIG. 1. The frequency band division processing unit 201 generates image data in which speckles appearing in the ultrasonic image are reduced by performing frequency enhancement on the inputted image data by using the frequency band division processing.

Next, the operation of the ultrasonic imaging apparatus as shown in FIG. 5 will be described.

When the user starts the ultrasonic imaging, similarly to that described in the first embodiment, transmission of ultrasonic waves is performed and ultrasonic echoes from the object are received, and thereby, detection signals are inputted to the ultrasonic imaging apparatus main body.

The plural detection signals inputted to the ultrasonic imaging apparatus main body are A/D converted after being subjected to the predetermined signal processing, once stored in the memory 151, and then, subjected to reception focus processing in the reception focus processing unit 152 so as to generate sound ray data. Image data obtained on the basis of thus generated sound ray data is subjected to speckle reduction and/or edge enhancement by the frequency band division processing in the frequency band division processing unit 201. Then, the image data that has been subjected to frequency band division processing is subjected to the predetermined image processing such as gradation processing in the image processing unit 155, and then, in the DSC 156, the scan format thereof is converted in accordance with the scan method. Furthermore, the image data the scan format of which has been converted is once stored in the image memory 160, and then, D/A converted and outputted. Thereby, an ultrasonic image is displayed on the screen of the display unit 180.

Figure 6:
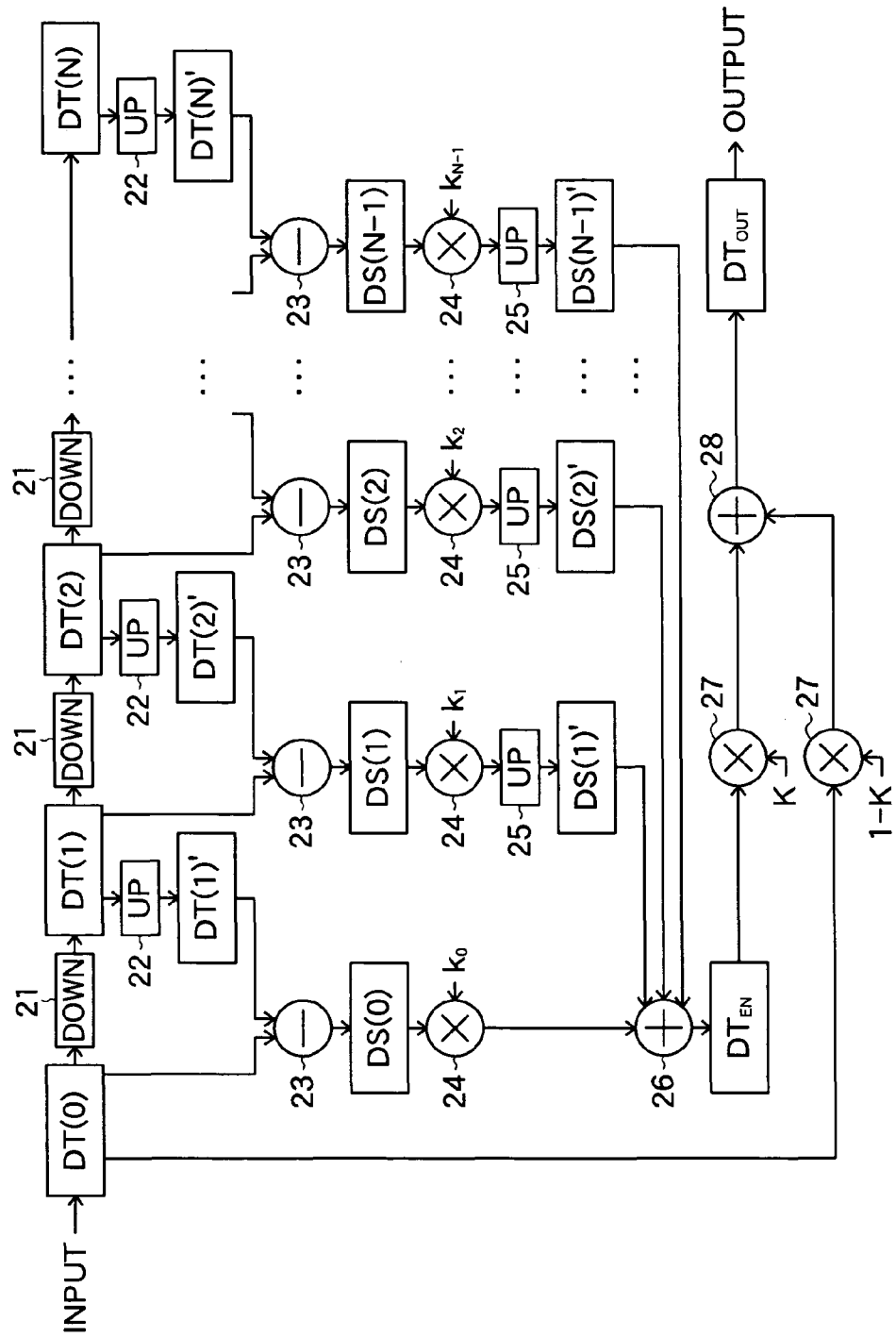
FIG. 6 is a diagram for explanation of frequency band division processing.

The frequency band division processing performed in the frequency band division processing unit 201 will be described in detail by referring to FIG. 6. FIG. 6 is a diagram for explanation of the frequency band division processing.

As shown in FIG. 6, when image data DT(0) generated in the reception focus processing unit 152 is inputted to the frequency band division processing unit 201, in a downsampling unit 21, image data DT (O) is thinned out and filter processing such as Nyquist filter processing is performed on the thinned out data. By repeating such processing, down-sampling data DT(1), DT(2), . . . , DT(N) having low spatial frequency components are sequentially generated.

Then, in an up-sampling unit 22, data having a value "0" is inserted into the n-th down-sampling data DT(n), where n=1 to N, and filter processing such as smoothing filter processing is performed. Thereby, up-sampling data DT(n)' having the same size as that of the adjacent (n−1)th data is obtained.

Next, in a subtracting unit 23, subtraction processing is performed between the (n−1)th down-sampling data DT(n−1) and the adjacent n-th up-sampling data DT(n)'. Thereby, subtraction data DS(0) to DS(N−1) are obtained. These subtraction data DS(0) to DS(N−1) correspond to data groups including frequency components that are formed by dividing spatial frequency components in a range from $f_0$ to $f_N$ included in image data DT(0) into N frequency bands, respectively. For example, the subtraction data DS(n), where n=0 to N−1, includes frequency components in a range from $f_n$ to $f_{n+1}$.

Then, in a multiplying unit 24, subtraction data DS(0), DS(1), . . . , DS(N−1) are multiplied by weighting factors, $k_0$, $k_1$, . . . , $k_{N-1}$, respectively. Further, the data DS(n)' multiplied by the weighting factors, where n=1 to N−1, are up-sampled in the up-sampling unit 25 to become the same as the original image data DT(0) in data size.

Thus equally sized data DS(0) and DS(1)', DS(2)', . . . , DS(N−1)' are added in an adding unit 26. Thereby, data $DT_{EN}$ weighted with respect to each spatial frequency band are generated. Furthermore, the weighted data $DT_{EN}$ and the original image data DT(0) are respectively multiplied by predetermined weighting factors K and (1−K) in the multiplying unit 27, and added to each other in the adding unit 28. Thus, image data $DT_{OUT}$ that has been subjected to the frequency enhancement processing is generated, and outputted to the image processing unit 155.

The weighting factors $k_0$ to $k_{N-1}$ to be used in the multiplying unit 24 are set in accordance with the characteristics of the image data to be processed. The weighting factors $k_0$ to $k_{N-1}$ may be stored in advance in association with parameters such as the ultrasonic frequency, the depth of the object, or observation part in the storage unit 101 as shown in FIG. 5. Alternatively, a user may input arbitrary values. In the former case, the weighting factors suitable for those parameters are set, and, in the latter case, user-desired frequency enhancement effect can be obtained.

In the ultrasonic imaging apparatus according to the embodiment, unlike a general ultrasonic imaging apparatus, frequency band division processing is performed on image data before scan conversion by the DSC. In the case where the order of the processing is thus changed, the following advantages are provided.

The image data before subjected to scan conversion such as coordinate conversion includes image information in a wider band and larger amount compared to that of the image data after the scan conversion. Accordingly, when the frequency band division processing is performed on the image data before the scan conversion, frequency bandwidth can be narrowed to increase the number of divided adjustable frequency bands. That is, the frequency enhancement processing can be controlled more finely. Therefore, by enhancing the desired frequency component, ultrasonic images with high image quality can be generated.

Further, as described referring to FIGS. 4A and 4B, the shape and size of the speckle pattern appearing in the ultrasonic image become ununiform by performing scan conversion on the image data. Accordingly, in the stage before scan conversion in which the shape and size of the speckle pattern are uniform, the weighting factors in the frequency bands containing many speckle components are set smaller and the frequency band division processing of suppressing the frequency components is performed, and thereby, speckle reduction effect can be obtained. Furthermore, by enhancing other frequency components, the speckle reduction effect and edge enhancement effect can be obtained simultaneously.

By the way, in the embodiment, the user may also select generating an ultrasonic image that has not been subjected to speckle reduction processing by switching the switch 153.

As described above, according to the embodiment, since frequency band division processing can be performed on image data before scan format conversion, image quality of ultrasonic images can be improved by the speckle reduction and/or edge enhancement.

In the case where image data obtained by transmitting and receiving an ultrasonic beam at an ultrasonic frequency of about 12 MHz, for example, is divided into six spatial frequency bands with a down-sampling rate of ½ by using the ultrasonic imaging apparatus according to the embodiment, when the weighting factor $k_0$ is set larger and the weighting factors $k_1$ and $k_2$ are set smaller, good results regarding speckle reduction effect and edge enhancement effect are obtained.

Figure 7:
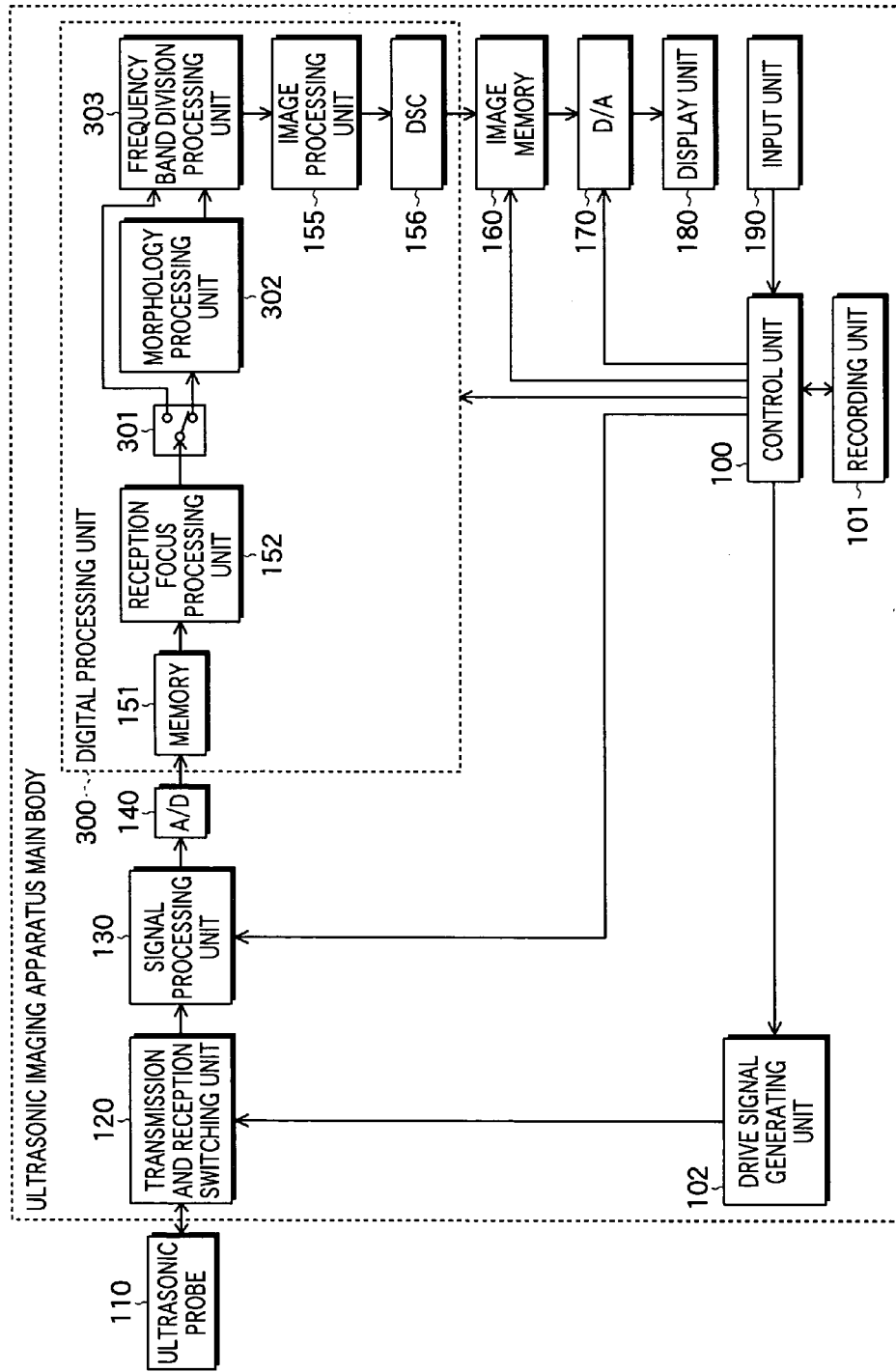
FIG. 7 is a block diagram showing the constitution of an ultrasonic imaging apparatus according to the third embodiment of the present invention.

Next, an ultrasonic imaging apparatus according to the third embodiment of the present invention will be described. FIG. 7 is a block diagram showing the constitution of the ultrasonic imaging apparatus according to the embodiment. This ultrasonic imaging apparatus includes a digital processing unit 300 as shown in FIG. 7 in place of the digital processing unit 150 as shown in FIG. 1. Other constitution is the same as in the ultrasonic imaging apparatus as shown in FIG. 1.

The digital processing unit 300 includes a switch 301, a morphology processing unit 302, and a frequency band division processing unit 303. The functions of the memory 151, reception focus processing unit 152, image processing unit 155, and DSC 156 included in the digital processing unit 300 are the same as in the digital processing unit 150.

The switch 301 is used for switching whether speckle reduction processing is performed on the generated sound ray data or not.

The morphology processing unit 302 performs processing of reducing speckles appearing in the ultrasonic image by performing morphology processing on the inputted image data. This morphology processing is the same as described in the first embodiment of the present invention by referring to FIG. 3.

The frequency band division processing unit 303 performs frequency enhancement processing by frequency band division on the image data that has been subjected to speckle reduction processing in the morphology processing unit 302. This frequency band division processing is the same as described in the second embodiment of the present invention by referring to FIG. 6.

As shown in FIG. 7, in the embodiment, morphology processing is performed on image data before scan conversion, and further, frequency enhancement processing is performed. Thus, by combining two kinds of processing, image quality of the ultrasonic image can be further improved. Specifically, by enhancing the component at a high spatial frequency with respect to the ultrasonic image having reduced speckles, interfaces of organs or the like are enhanced. In the case where the image data obtained by transmitting and receiving an ultrasonic beam at an ultrasonic frequency of about 12 MHZ, for example, is divided into six spatial frequency bands at a down-sampling rate of ½, when the weighting factor $k_0$ is set larger, good results are obtained with respect to speckle reduction effect and edge enhancement effect.

The user can select whether the speckle reduction processing is performed or not by inputting an instruction to switch the switch 301. Thereby, the user can obtain a desired ultrasonic image.

As described above, according to the first to third embodiments of the present invention, since image processing is performed on the original image data representing scan space (sound ray space) of the ultrasonic beam before characteristics of the original image are changed or lost due to scan format conversion, image processing utilizing the image characteristics that the original image has can be performed, and image quality of the ultrasonic image can be improved.

Figure 8A:
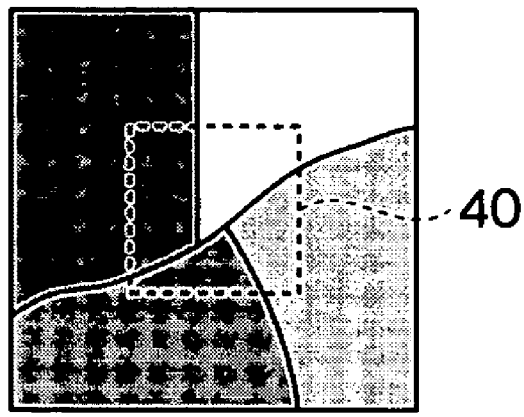
FIGS. 8A and 8B are diagrams for explanation of mask processing.
Figure 8B:
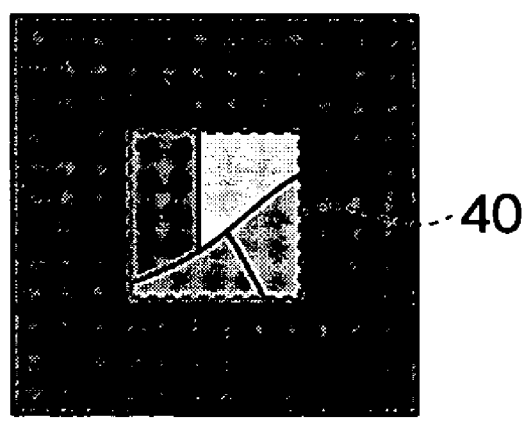

In the first to third embodiments of the present invention, speckle reduction processing and edge enhancement processing are performed on the data before scan conversion. However, various kinds of mask processing such as smoothing filter processing may be performed on the data. Here, the mask processing is to temporarily except the designated region 40 from a target of processing as shown in FIG. 8A to thereby perform desired image processing on the regions other than the masked region 40 as shown in FIG. 8B. The above-described morphology processing and the generally known smoothing filter processing are kinds of mask processing.

Generally, in comparison between before DSC and after DSC, the amount of data to be processed is smaller before DSC. Accordingly, when the mask processing is performed on plural pixels while scanning, it is advantageous that processing time can be shortened by performing those processing before DSC. Especially, in radial scan using an ultrasonic endoscope or the like, the amount of data as a target of processing is large, and therefore, the effect by shortening the processing time is great.

Figure 9:
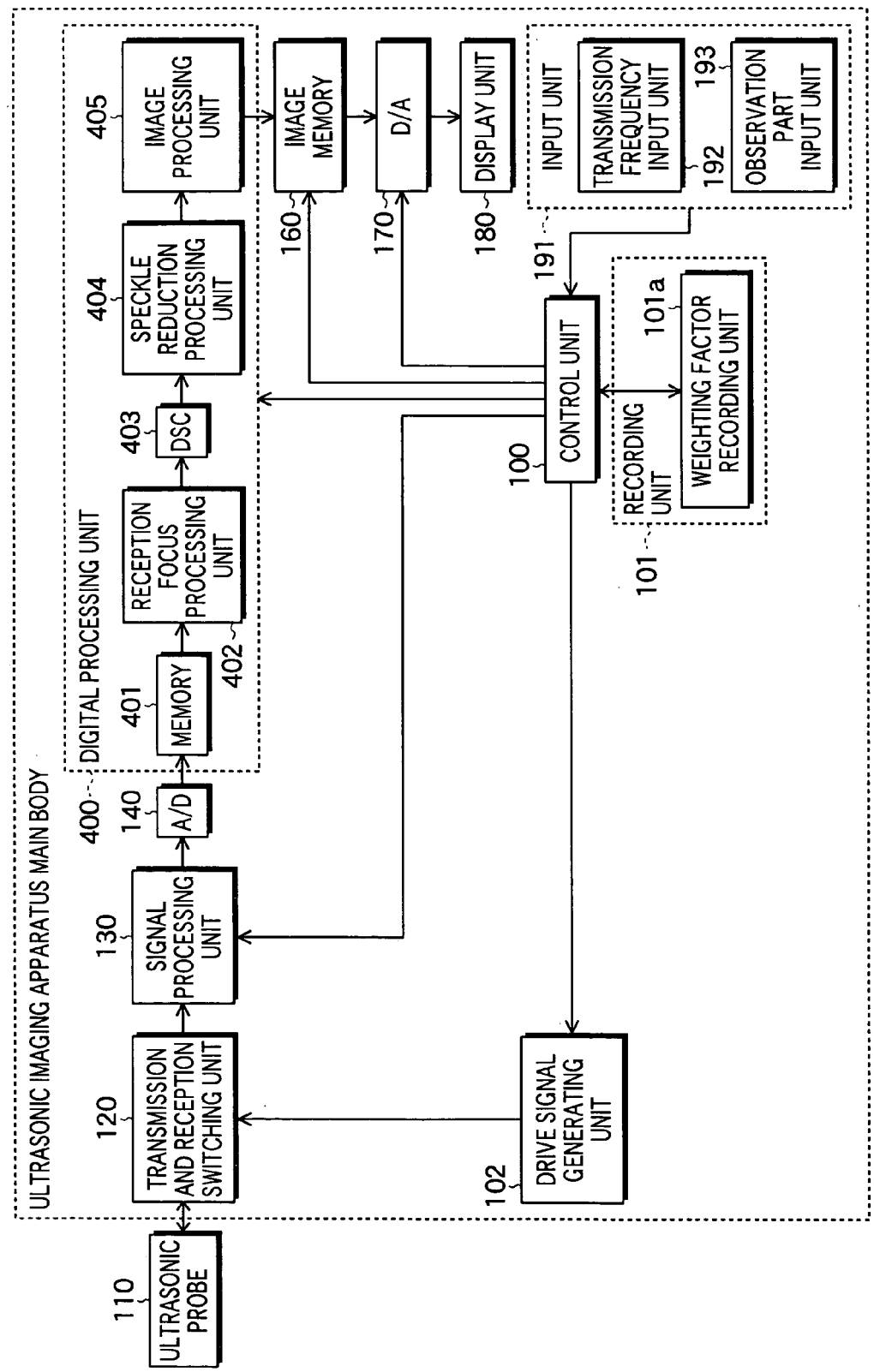
FIG. 9 is a block diagram showing the constitution of an ultrasonic imaging apparatus according to the fourth embodiment of the present invention.

Next, an ultrasonic imaging apparatus according to the fourth embodiment of the present invention will be described. FIG. 9 is a block diagram showing the constitution of the ultrasonic imaging apparatus according to the embodiment. This ultrasonic imaging apparatus includes a digital processing unit 400 as show in FIG. 9 in place of the digital processing unit 150 as shown in FIG. 1, and further, includes an input unit 191 as shown in FIG. 9 in place of the input unit 190 as shown in FIG. 1. Other constitution is the same as in the ultrasonic imaging apparatus as shown in FIG. 1.

The digital processing unit 400 includes a memory 401, a reception focus processing unit 402, a digital scan converter (DSC) 403, a speckle reduction processing unit 404, and an image processing unit 405. The memory 401 includes line memories corresponding to plural channels of the signal processing unit 130, and stores generated detection data in respective lines in chronological order. Alternatively, the memory 401 may be formed by a cine memory for storing moving images for a certain period.

The reception focus processing unit 402 generates sound ray data representing a reception beam the focal point of which is narrowed in a predetermined sound ray direction by performing reception focus processing on the plural detection data stored in the memory 401, as well as the reception focus processing unit 152 as shown in FIG. 1. Further, image data is obtained by performing detection with respect to a waveform represented by the sound ray data. The values of this image data represent pixel values of plural pixels forming an ultrasonic image.

The DSC 403 generates image data for display by converting the scan format from the image data in the scan space of the ultrasonic beam into the image data in the physical space, as well as the DSC 156 as shown in FIG. 1.

The speckle reduction processing unit 404 performs processing on the inputted image to reduce speckles in the ultrasonic image by performing morphology processing using weighting factors. Details about the data processing method (ultrasonic image processing method) and the operation in this speckle reduction processing unit 404 will be described later.

The image processing unit 405 performs image processing such as STC (sensitivity time control) for correcting distance attenuation, linear gradation processing including gain adjustment and contrast adjustment, non-linear gradation processing including γ correction, etc. on the inputted image data.

In the embodiment, these respective units 402 to 405 are formed by a CPU and software. However, they may be formed by using analog circuits or digital circuits. Further, the digital processing unit 400 including the memory 401 to image processing unit 405 may be formed by using a personal computer (PC). In this case, the data may be inputted directly to the digital processing unit 400 via the ultrasonic probe 110, the signal processing unit 130 and so on. Alternatively, the data may be inputted via a network or recording medium.

The input unit 191 is an input device to be used when various instructions or information to the ultrasonic imaging apparatus main body, and may be formed by an adjustment console including an adjustment knob, input button, a keyboard, touch panel, etc., or a pointing device such as an external keyboard, mouse, etc. The input unit 191 includes a transmission frequency input unit 192 to be used for setting transmission frequencies, an observation part (body mark) input unit 193 to be used for inputting a part that the user desires to observe, etc.

Next, an ultrasonic image processing method to be used in the speckle reduction processing unit 404 as shown in FIG. 9 will be described by referring to FIGS. 1A to 13B in detail. The ultrasonic image processing method according to the embodiment is to reduce the influence of speckles in the ultrasonic image by utilizing the morphology processing.

Figure 10A:
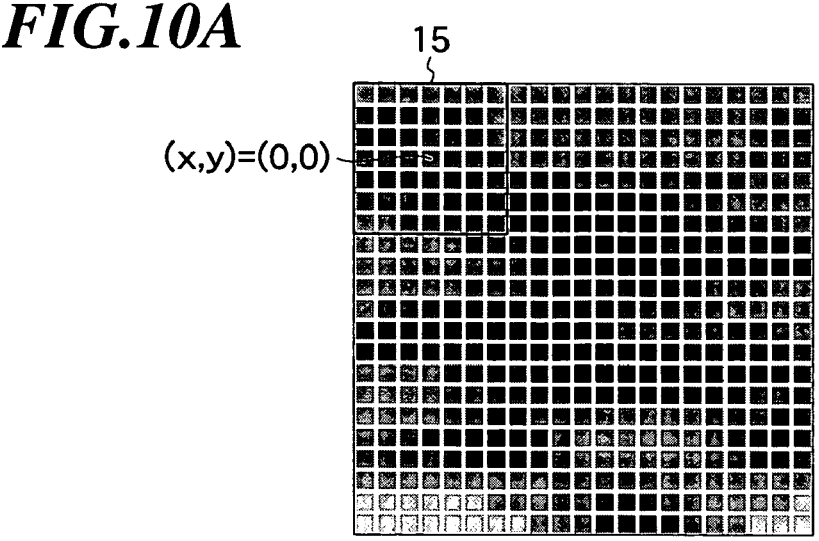
FIGS. 10A-10C are diagrams for explanation of speckle reduction by general morphology processing and artifacts produced due to the mask size.

First, the case is considered where the general morphology processing described as above referring to FIG. 3 is performed on an ultrasonic image (original image) as shown in FIG. 10A. First, dilation is performed on the original image as shown in FIG. 10A with a mask size of 7×7 (mask area 15). Thereby, as shown in FIG. 10B, high brightness area expands and relatively low brightness areas collect at the central part.

Figure 10B:
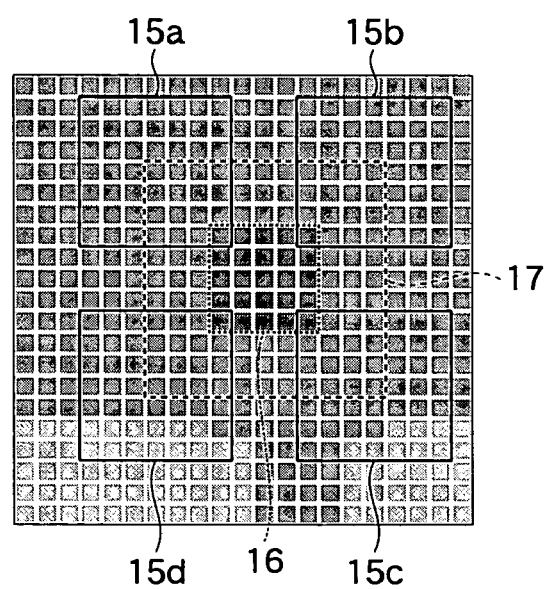
Figure 10C:
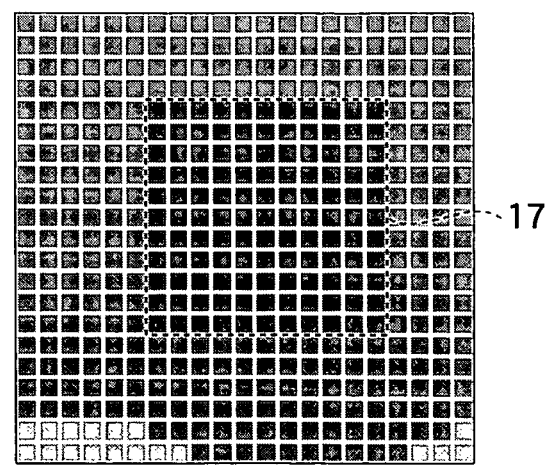

Then, erosion is performed on the image as shown in FIG. 10B. When a part of the mask area 15 overlaps with the central low brightness area 16, that is, the mask is at the areas 15a to 15d or the inner side thereof, the pixel value of the pixel of interest is converted into a pixel value in the low brightness area 16. Accordingly, the values of all pixels existing at the center pixel of areas 15a to 15d or the inner side thereof are converted into low brightness pixel values, and a rectangular low brightness area 17 is produced at the central part of the image as shown in FIG. 10C.

This low brightness area 17 is an artifact that occurs due to the mask size and mask shape. The existence of such an artifact is not desirable in use of the ultrasonic image for medical diagnosis.

Accordingly, in the embodiment, morphology processing is performed by using weighting factors set depending on the distance from the pixel of interest.

Figure 11:
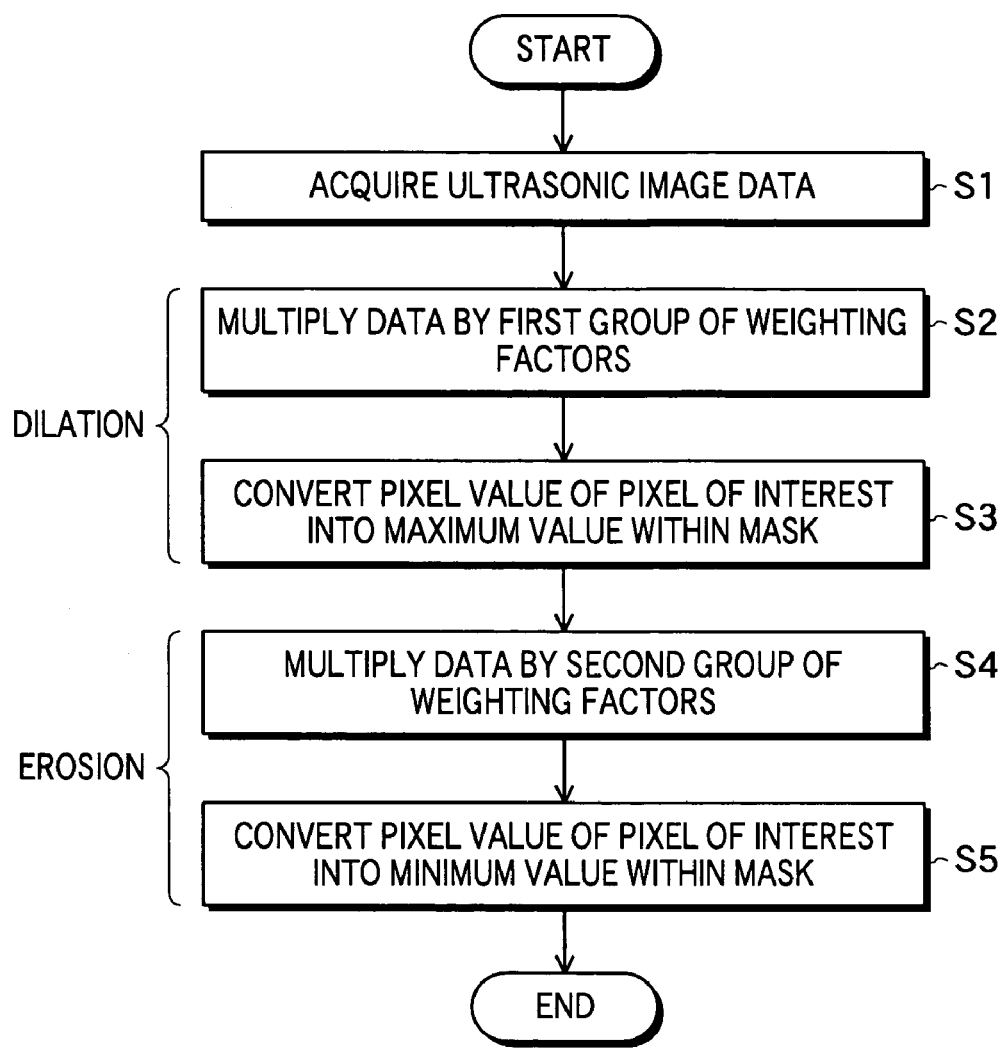
FIG. 11 is a flowchart showing an ultrasonic image processing method according to the fourth embodiment of the present invention.
Figure 12A:
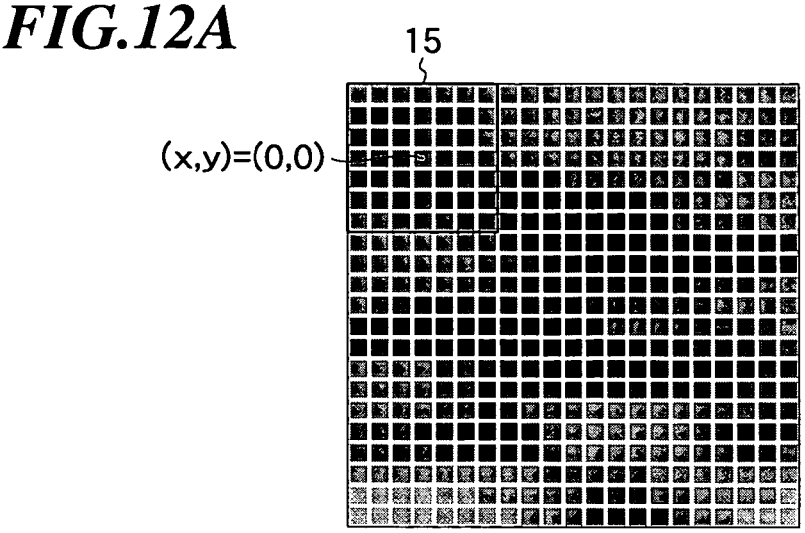
FIGS. 12A-12C are diagrams for explanation of the morphology processing performed in an ultrasonic image processing method according to the fourth embodiment of the present invention.
Figure 12B:
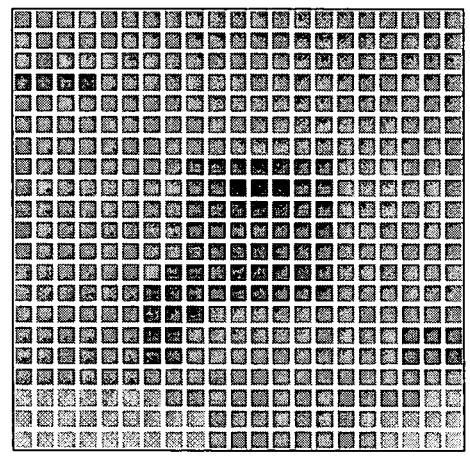

FIG. 11 is a flowchart showing the ultrasonic image processing method according to the embodiment, FIGS. 12A-12B are diagrams for explanation of the morphology processing in the embodiment, and FIGS. 13A and 13B show weighting factors used in the embodiment.

At step S1 in FIG. 11, ultrasonic detection signals are acquired by transmitting ultrasonic waves from the ultrasonic probe toward an object to be inspected and receiving ultrasonic echoes reflected from the object, and ultrasonic image data is acquired by performing signal processing such as amplification, A/D conversion and detection on those ultrasonic detection signals. FIG. 12A is an ultrasonic image (original image) represented by thus acquired ultrasonic image data.

Then, at steps S2 and S3, dilation using weighting factors is performed on the original image as shown in FIG. 12A.

That is, at step S2, by using a certain pixel of interest $(x,y)=(0,0)$, which forms a part of the original image shown in FIG. 12A, as a center, for example, the pixel values of the pixels $(x,y)$ within the mask area having mask size of 7×7 are multiplied by the weighting factors $dk(x,y)$ (hereinafter, also referred to as "dilation factors") as shown in FIG. 13A. Here, $(x,y)$ are coordinates in the mask area. As shown in FIG. 13A, dilation factors $dk(x,y)$ are set to have the value "1" in the pixel of interest (dk(0, 0)=1) and have smaller values as the pixel separates from the pixel of interest.

Furthermore, at step S3, as represented by the following equation (9), the maximum value is extracted from the pixel values multiplied by the weighting factors dk(x,y) and the pixel value of the pixel of interest is converted into the maximum value.

$$g' = \max_{x,y \in G} \{Y(x, y) \times dk(x, y)\} \qquad (9)$$

Where "g'" represents an image obtained by dilation, "Y" represents a pixel value of the original image, and "G" represents a mask determined based on the structure element. By performing such processing on each of the plural pixels forming the ultrasonic image, an image is obtained in which the high brightness area expands as shown in FIG. 12B.

Next, at steps S4 and S5, erosion using weighting factors is performed on the ultrasonic image that has been subjected to dilation.

That is, at step S4, by using the pixel of interest (x,y)=(0,0) as the center, pixel values of pixels (x,y) within the mask area having mask size of 7×7 are multiplied by weighting factors ek(x,y) (hereinafter, also referred to as "erosion factors") as shown in FIG. 13B. As shown in FIG. 13B, the erosion factors are set to have the value "1" in the pixel of interest (ek(0, 0)=1) and have larger values as the pixel separates from the pixel of interest.

Furthermore, at step S5, as represented by the following equation (10), the minimum value is extracted from the pixel values multiplied by the weighting factors ek(x,y) and the pixel value of the pixel of interest is converted into the minimum value.

$$f' = \min_{x,y \in G} \{g'(x, y) \times ek(x, y)\} \qquad (10)$$

Where "f'" represents an image obtained by erosion. By performing such processing on each of the plural pixels forming the ultrasonic image, an image is obtained in which the high brightness area contracts as shown in FIG. 12C.

Figure 12C:
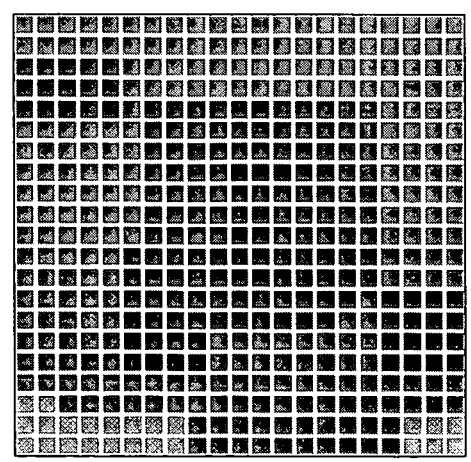

As clearly seen by comparison between FIG. 10C and FIG. 12C, few artifacts due to the mask size or mask shape appear in FIG. 12C. This is because, as shown in FIGS. 13A and 13B, the values of factors by which the pixels apart from the mask center are multiplied are made smaller in the dilation of taking the maximum value within the mask area, and the values of factors by which the pixels apart from the mask center are multiplied are made larger in the erosion of taking the minimum value within the mask area, and thereby, the influence of the mask periphery on the mask center can be made smaller.

Next, the weighting factors (dilation factors and erosion factors) to be used in the embodiment will be described in detail.

In order to improve the effect of reducing the influence of the speckles without producing artifacts due to the mask size and mask shape, it is desired that the dilation factors and the erosion factors are set depending on the amounts of characteristics of speckles including sizes and shapes of speckle patterns.

Here, the higher the frequency of the transmitted ultrasonic waves, the higher the resolving power of the ultrasonic image becomes. On the other hand, the lower the frequency of the transmitted ultrasonic waves, the lower the resolving power of the ultrasonic image becomes. Further, the ultrasonic wave becomes easily attenuated as the frequency becomes higher, and therefore, in the ultrasonic echoes reflected from the depth part of the object, components at relatively low frequencies remain. Accordingly, with respect to the depth direction (distance direction) of the object, the larger the depth, the lower the resolving power of the ultrasonic image becomes. Thus, the size of the speckle pattern appearing in the ultrasonic image has tendency to become smaller as the frequency of the ultrasonic wave transmitted from the ultrasonic probe is higher, and become larger as the frequency of the ultrasonic wave is lower. Further, there is a tendency that the speckle pattern becomes small in the ultrasonic image representing the shallow part of the object, and the speckle pattern becomes large in the ultrasonic image representing the deep part of the object.

On the other hand, the shape of the speckle pattern is affected by the depth of the object represented in the ultrasonic image (hereinafter, also referred to as "depth of ultrasonic image), the scan method of ultrasonic waves, image processing performed on the image data, and so on. For example, in the original image data before subjected to coordinate conversion corresponding to the scan method, the speckle pattern has an elliptical shape longer in the distance direction and shorter in the azimuthal direction. Further, when interpolation processing is performed on the original image data obtained by linear scan, the speckle pattern becomes to have an elliptical shape shorter in the distance direction and longer in the azimuthal direction.

Accordingly, using the frequency of the transmission ultrasonic wave and the depth of the ultrasonic image as parameters, the mask size, mask shape, and factor values of the dilation factors and erosion factors are set. Alternatively, as parameters, the kind and part of an organ such as a heart or liver as a target of observation may be used. The frequency of the transmission ultrasonic wave to be used when a certain organ is imaged, the range of depth at which the organ exists, the scan method, types of coordinate conversion and so on are generally determined. Accordingly, the frequency of the transmission ultrasonic wave, the depth of the ultrasonic image, the scan method and so on may be associated with the observation part in advance, and the dilation factors and the erosion factors may be set in accordance with each observation part. Further, a combination of the frequency of the transmission ultrasonic wave and the depth of the ultrasonic image, a combination of the observation part and the frequency of the transmission ultrasonic wave, a combination of the observation part and the depth of the ultrasonic image, or a combination of the frequency of the transmission ultrasonic wave and the depth of the ultrasonic image and the observation part may be used.

Specific examples of the mask size and mask shape of the weighting factors set based on the above-described parameters will be cited. For example, the case where a linear image of the cervical part is generated by using an ultrasonic probe for transmitting ultrasonic waves at a center frequency of 12 MHz is considered. In this case, since the frequency of the transmission ultrasonic wave is relatively high and the depth of the ultrasonic image is small, the speckle pattern is relatively small but long in the azimuthal direction by the interpolation processing. Accordingly, for example, an anisotropic mask of (azimuthal direction)×(distance direction)=9×5 is used. Further, the case where a linear image of the cervical part is generated by using ultrasonic wave at a center frequency of 3.5 MHz is considered. In this case, since the frequency of the transmission ultrasonic wave is relatively low and the depth of the ultrasonic image is large, the speckle pattern becomes relatively large. Accordingly, an anisotropic mask of (azimuthal direction)×(distance direction)=9×13 is used, for example.

Next, the values of weighting factors will be described. In dilation and erosion, the smaller the difference in weighting factors at the mask center and the mask periphery becomes, the larger the influence by the mask periphery on the mask center becomes, so that the speckle reduction effect becomes higher. Contrary, the larger the difference in weighting factors becomes, the further speckle reduction effect becomes moderate. Therefore, in the case where the frequency of the transmission ultrasonic wave is low or the deep part of the object is imaged (that is, the size of the speckle pattern is large), the speckle reduction effect may be made higher by making the difference in weighting factors smaller. Specifically, the values of dilation factors are made larger within the range less than "1", and the values of erosion factors are made smaller within the range more than "1". Contrary, in the case where the frequency of the transmission ultrasonic wave is high or the shallow part of the object is imaged (that is, the size of the speckle pattern is small), the difference in weighting factors may be made larger. Specifically, the values of dilation factors are made smaller and the values of erosion factors are made larger. In this case, the effect of suppressing the artifacts becomes higher.

Further, a user may arbitrarily set the dilation factors and erosion factors. The user sets these factors while observing the ultrasonic image displayed on the screen, and thereby, desired speckle reduction and artifact suppression effects can be obtained.

Such dilation factors and erosion factors are desirably in a relationship in which multiplication of factors in corresponding positions within the mask area results in "1", i.e., in the relationship of dk(x,y)×ek(x,y)=1. Thereby, before and after the morphology processing, variations in the brightness of the entire ultrasonic image, i.e., variations in average level of pixel values of all pixels that form the ultrasonic image can be suppressed.

As described above, according to the embodiment, when the smoothing processing is performed on the ultrasonic image, speckles can be reduced while suppressing artifacts due to the mask size and mask shape. Therefore, an ultrasonic image with good image quality can be obtained.

The ultrasonic image processing method according to the embodiment can not only perform smoothing on the ultrasonic image but also obtain edge enhancement effect by combining known linear or non-linear brightness conversion, enhancement processing such as unsharp masking, frequency processing, etc. For example, by performing frequency enhancement processing after performing the image processing according to the embodiment on the original image data, the accuracy of the edge-enhanced image can be improved.

Next, the operation of the ultrasonic imaging apparatus as shown in FIG. 9 will be described.

Prior to the start of ultrasonic imaging, a user inputs predetermined setting items by using the input unit 191. For example, the user inputs information such as the frequency of the transmission ultrasonic wave and the observation part (e.g., the name of an organ such as a heart or liver) by using the transmission frequency input unit 192 and the observation part input unit 193. Alternatively, the user may connect the ultrasonic probe 110 to the ultrasonic imaging apparatus main body so that the control unit 100 may recognize the kind of the ultrasonic probe 110 and the frequency of the transmission ultrasonic wave. Thereby, the control unit 100 sets the predetermined items for transmitting and receiving ultrasonic waves, and selects weighting factors to be used in the morphology processing from the plural weighting factors recorded in a weighting factor recording unit 101a based on the parameters.

Then, when the user starts ultrasonic imaging, under the control by the control unit 100, an ultrasonic beam having the set frequency is transmitted from the ultrasonic probe 110, the object is scanned in accordance with the scan method such as linear scan, sector scan, convex scan, radial scan, or the like. This ultrasonic beam is reflected by a reflector existing within the object, and plural ultrasonic echoes are received by the ultrasonic probe 110. The received ultrasonic echoes are converted into electric signals in the ultrasonic probe 110, and inputted as detection signals to the ultrasonic imaging apparatus main body.

The plural detection signals inputted to the ultrasonic imaging apparatus main body are subjected to predetermined signal processing in the signal processing unit 130. Thereby, wide band detection signals from which unwanted frequency components are eliminated are obtained. These detection signals are A/D converted, once stored in the memory 401, and then, subjected to reception focus processing in the reception focus processing unit 402 to generate sound ray data. Image data obtained on the basis of thus generated sound ray data is input to the DSC 403. In the DSC 403, the scan format conversion according to the scan method is performed on the inputted sound ray data.

Thus, generated image data is subjected to morphology processing using weighting factors, which have been selected by the control unit 100 in advance, in the speckle reduction processing unit 404. Alternatively, at this time, the dilation factors and the erosion factors, which have been arbitrarily inputted by the user, may be used.

The image data that has been subjected to speckle reduction processing is subjected to predetermined image processing such as gradation processing in the image processing unit 405, once stored in the image memory 160, and then, D/A converted and outputted. Thereby, the ultrasonic image is displayed on the screen of the display unit 180.

Figure 14:
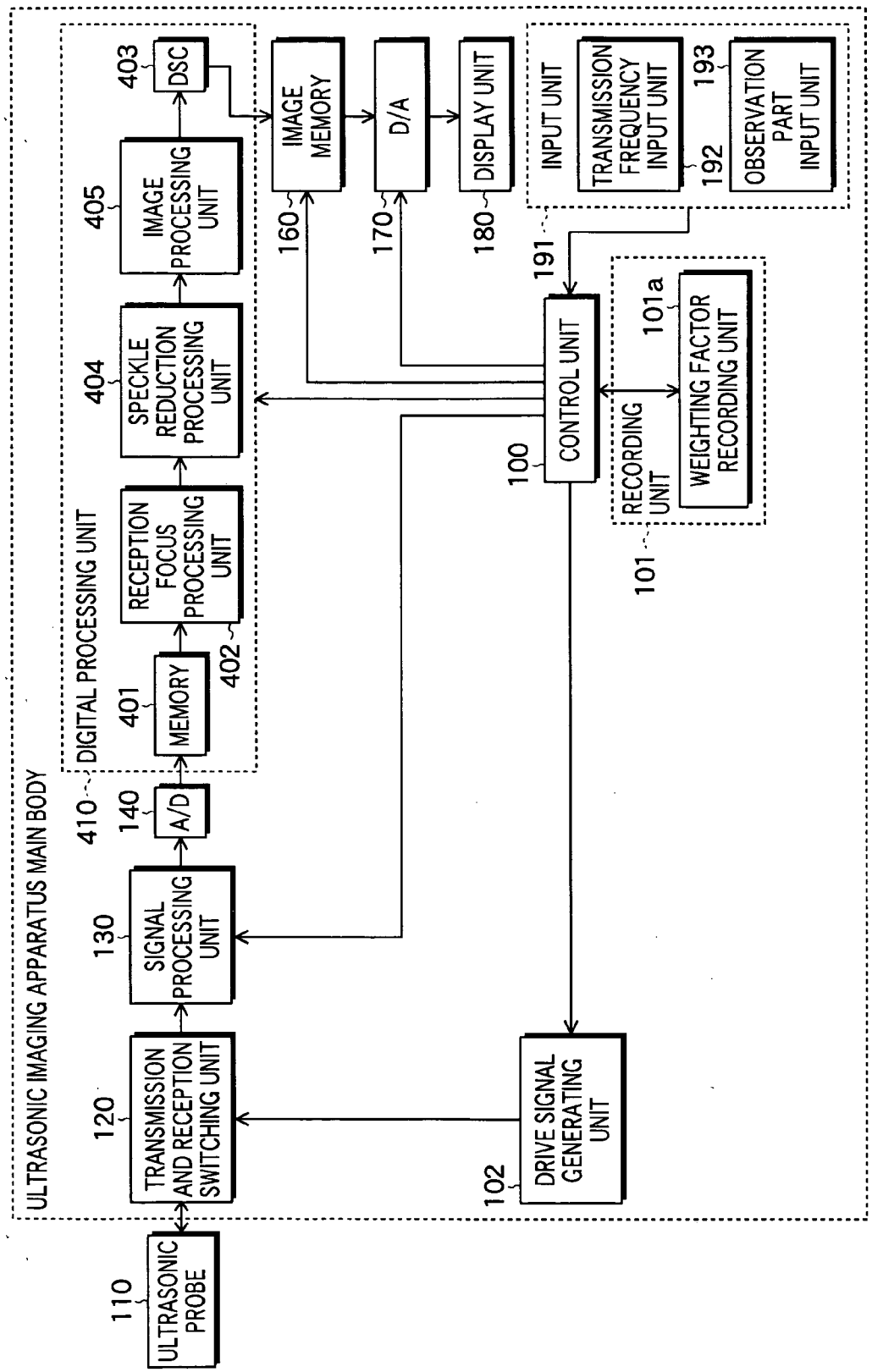
FIG. 14 is a block diagram showing the constitution of a modified example of the ultrasonic imaging apparatus according to the fourth embodiment of the present invention.

Next, a modified example of the ultrasonic imaging apparatus according to the fourth embodiment of the present invention will be described. FIG. 14 is a block diagram showing the constitution of the modified example of the ultrasonic imaging apparatus according to the embodiment. This ultrasonic imaging apparatus includes a digital processing unit 410 as shown in FIG. 14 in place of the digital processing unit 400 as shown in FIG. 9. Other constitution is the same as in the ultrasonic imaging apparatus as shown in FIG. 9.

As clearly seen from the drawing, the order of the data processing after reception focus processing is different between the digital processing unit 400 as shown in FIG. 9 and the digital processing unit 410 as shown in FIG. 14. That is, in the digital processing unit 400 as shown in FIG. 9, as well as in the general ultrasonic imaging apparatus, the image data generated in the reception focus processing unit 401 is subjected to scan form at conversion, and then, subjected to image processing including speckle reduction processing. Contrary, in the digital processing unit 410 as shown in FIG. 14, the image data is subjected to speckle reduction processing in the speckle reduction processing unit 404 and image processing such as gradation processing in the image processing unit 405, and then, subjected to scan format conversion in the DSC 403.

In this modified example, the reason for performing the speckle reduction processing before scan format conversion on the image data is that the same advantages exist as described above referring to FIG. 4. That is, by performing speckle reduction processing before the speckle pattern is deformed, uniform speckle reduction effect can be obtained in the entire image. Accordingly, the effect of the morphology processing using weighting factors performed in the embodiment can be further improved. Further, by performing speckle reduction processing in the stage in which the amount of data is small before performing DSC, processing can be performed at high speed. Especially, in the case of a radial image acquired by the ultrasonic endoscope or the like, a great effect can be obtained.

Further, generally, before subjected to scan conversion, the speckle pattern has a shape extending longer in the distance direction. Accordingly, in this case, an anisotropic mask of (azimuthal direction)×(distance direction)=9×13 is used, for example. Furthermore, by performing scan conversion on the image after morphology processing, abdominal convex image can be obtained.

Also in the modified example, γ correction of the image processing in the image processing unit 405 may be performed after scan format conversion in the DSC 403.

Figure 15:
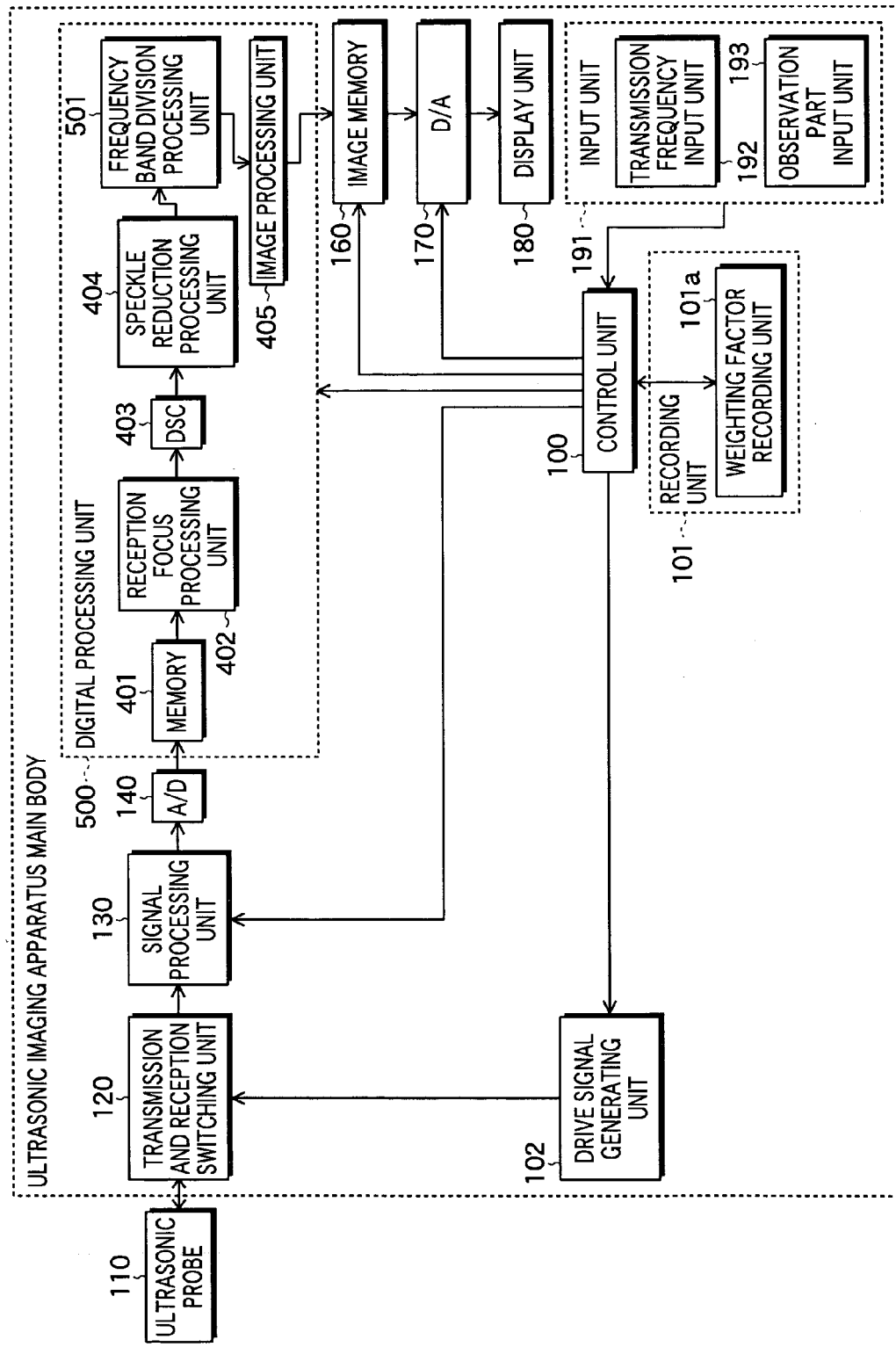
FIG. 15 is a block diagram showing the constitution of an ultrasonic imaging apparatus according to the fifth embodiment of the present invention.

Next, an ultrasonic imaging apparatus according to the fifth embodiment of the present invention will be described. FIG. 15 is a block diagram showing the constitution of the ultrasonic imaging apparatus according to the embodiment. This ultrasonic imaging apparatus includes a digital processing unit 500 as shown in FIG. 15 in place of the digital processing unit 400 as shown in FIG. 9. Other constitution is the same as in the ultrasonic imaging apparatus as shown in FIG. 9.

The digital processing unit 500 further includes a frequency band division processing unit 501 provided in the subsequent stage of the speckle reduction processing unit 404 to the digital processing unit 400 as shown in FIG. 9. Other constitution in the digital processing unit 500 is the same as in the digital processing unit 400.

The frequency band division processing unit 501 performs frequency enhancement processing by dividing a spatial frequency component into plural frequency bands with respect to the image data that has been subjected to speckle reduction processing in the speckle reduction processing unit 404. The detailed operation of the frequency band division processing unit 501 is the same as described in the second embodiment of the present invention by referring to FIG. 6.

Here, the weighting factors $k_0$ to $k_{N-1}$ to be used in the multiplying unit 24 as shown in FIG. 6 are set in accordance with the characteristics of the image data to be processed. As in the embodiment, when the frequency enhancement processing is performed on the image data that has been subjected to speckle reduction processing, it is preferable to enhance the component having relatively high spatial frequency. In the case where image data obtained by transmitting and receiving an ultrasonic beam at an ultrasonic frequency of about 12 MHz, for example, is divided into six spatial frequency bands with a down-sampling rate of ½, when the weighting factor $k_0$ is set larger, good results are obtained. The weighting factors $k_0$ to $k_{N-1}$ may be recorded in the storage unit 101 as shown in FIG. 15 in advance in correspondence with parameters such as the ultrasonic frequency, the depth of the object and observation part. Alternatively, the user may input arbitrary values.

As described above, according to the embodiment, frequency enhancement processing based on frequency band division is performed on the image data processed in the speckle reduction processing unit 404, and thereby, the image in which speckles have been reduced can be subjected to edge enhancement while suppressing artifacts. Therefore, an ultrasonic image with high accuracy can be obtained.

Figure 16:
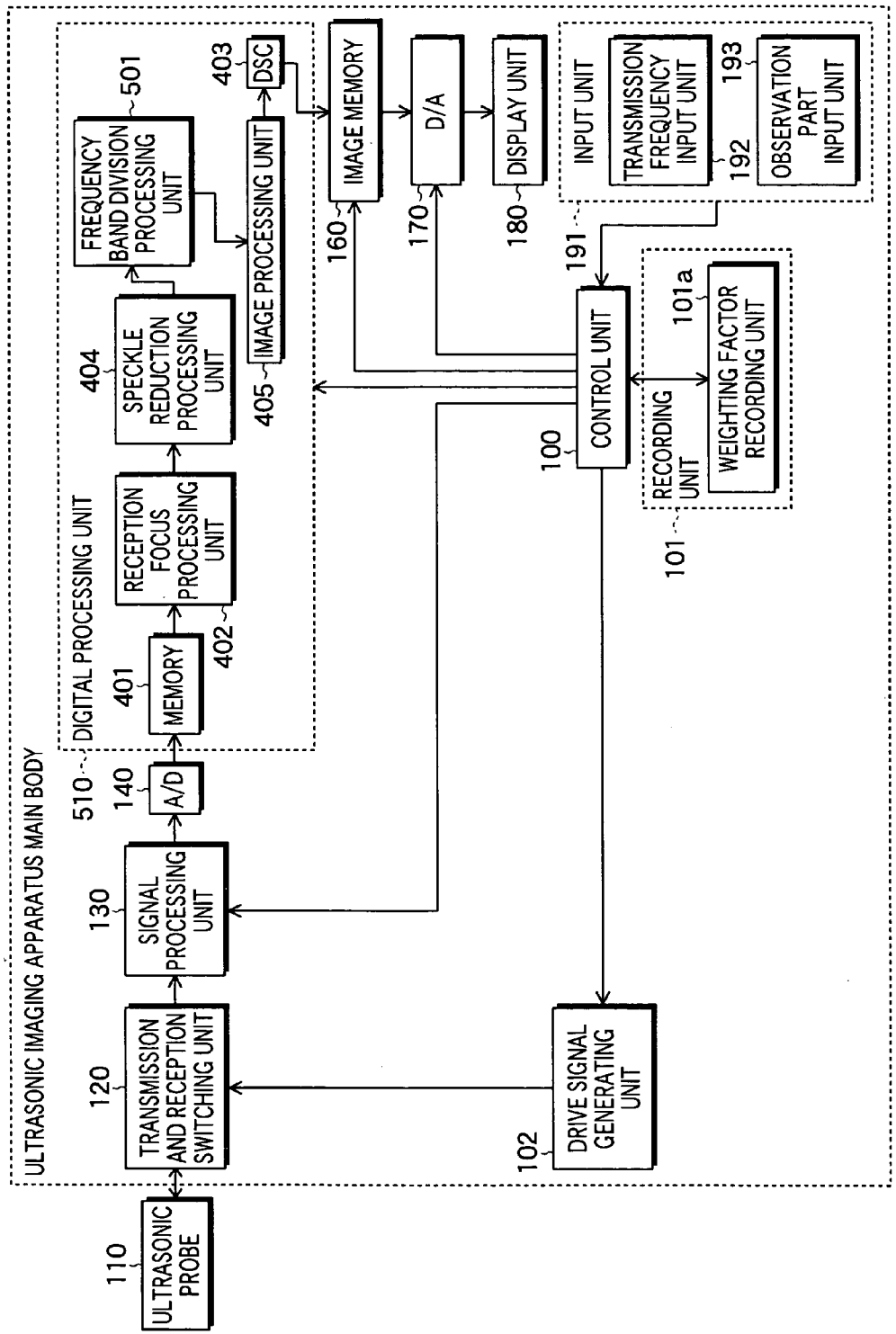
FIG. 16 is a block diagram showing the constitution of a modified example of the ultrasonic imaging apparatus according to the fifth embodiment of the present invention.

Next, a modified example of the ultrasonic imaging apparatus according to the fifth embodiment of the present invention will be described. FIG. 16 is a block diagram showing the constitution of the modified example of the ultrasonic imaging apparatus according to the embodiment. This ultrasonic imaging apparatus includes a digital processing unit 510 as shown in FIG. 16 in place of the digital processing unit 500 as shown in FIG. 15. Other constitution is the same as in the ultrasonic imaging apparatus as shown in FIG. 15.

The order of the data processing after reception focus processing is different between the digital processing unit 500 as shown in FIG. 15 and the digital processing unit 510 as shown in FIG. 16. That is, in the digital processing unit 510 as shown in FIG. 16, the sound ray data generated in the reception focus processing unit 402 is subjected to image processing such as speckle reduction processing in the speckle reduction processing unit 404, frequency enhancement processing in the frequency band division processing unit 501, and gradation processing in the image processing unit 405, and then, subjected to scan format conversion in the DSC 403.

In this modified example, the reason for performing the frequency band division processing before converting scan format on the image data is the same as described above in the second embodiment. That is, since the image data before subjected to processing such as scan conversion includes information in a wider band and larger amount, and therefore, by performing the frequency band division processing on such image data, frequency bandwidth can be narrowed to increase the number of divided adjustable frequency bands. Therefore, the frequency enhancement processing can be controlled more finely, and thereby, an ultrasonic image with high accuracy can be obtained by the precise edge enhancement processing.

As described above, according to the fourth and fifth embodiments of the present invention, since morphology processing is performed on the acquired ultrasonic image by using weighting factors set depending on positions within the mask area, speckles can be reduced while suppressing artifacts due to the structure element. Therefore, an ultrasonic image with high image quality in which noise has been reduced can be obtained.

The invention claimed is:

1. An ultrasonic image processing apparatus for processing a plurality of signals obtained by scanning an object to be inspected with an ultrasonic beam and respectively representing pixel values of a plurality of pixels within an ultrasonic image, said apparatus comprising:

a morphology processing unit for processing the plurality of signals to reduce speckles appearing in the ultrasonic image; and a digital scan converter for converting a scan format of the plurality of signals processed by said morphology processing unit;

wherein said morphology processing unit performs first signal processing on the plurality of signals while moving a mask area determined based on a structure element in morphology processing, said first signal processing including multiplying pixel values of a plurality of pixels within the mask area by a first group of weighting factors set depending on positions within the mask area, respectively, and converting a pixel value at a center of the mask area into a maximum value of the pixel values multiplied by the first group of weighting factors, and performs second signal processing on the plurality of signals subjected to the first signal processing while moving a mask area determined based on a structure element in morphology processing, said second signal processing including multiplying pixel values of a plurality of pixels within the mask area by a second group of weighting factors set depending on positions within the mask area, respectively, and converting a pixel value at a center of the mask area into a minimum value of the pixel values multiplied by the second group of weighting factors; and wherein said first and second groups of weighting factors are set such that a value obtained by multiplying corresponding factors within the mask area in said first and second groups together becomes 1.

2. The ultrasonic image processing apparatus according to claim 1, wherein:
said first group of weighting factors are set smaller according as the positions are apart from the center of the mask area; and
said second group of weighting factors are set larger according as the positions are apart from the center of the mask area.

3. The ultrasonic image processing apparatus according to claim 1, wherein said first and second groups of weighting factors are set based on a frequency of ultrasonic waves to be transmitted.

4. The ultrasonic image processing apparatus according to claim 1, wherein said first and second groups of weighting factors are set based on a depth of the object represented in the ultrasonic image.

5. The ultrasonic image processing apparatus according to claim 1, wherein said first and second groups of weighting factors are set based on a target part of observation.

6. The ultrasonic image processing apparatus according to claim 1, wherein said plurality of signals are obtained by scanning the object by using an ultrasonic endoscope being inserted into the object.

7. The ultrasonic image processing apparatus according to claim 1, further comprising:
a switch for switching whether reduction of speckles by said morphology processing unit is performed or not based on information inputted by a user.

8. An ultrasonic image processing method of processing a plurality of signals obtained by scanning an object to be inspected with an ultrasonic beam and respectively representing pixel values of a plurality of pixels within an ultrasonic image, said method comprising the steps of:
(a) processing the plurality of signals to reduce speckles appearing in the ultrasonic image; and
(b) converting a scan format of the plurality of signals processed at step (a);
wherein step (a) includes (i) performing first signal processing on the plurality of signals while moving a mask area determined based on a structure element in morphology processing, said first signal processing including multiplying pixel values of a plurality of pixels within the mask area by a first group of weighting factors set depending on positions within the mask area, respectively, and converting a pixel value at a center of the mask area into a maximum value of the pixel values multiplied by the first group of weighting factors, and (ii) performing second signal processing on the plurality of signals subjected to the first signal processing while moving a mask area determined based on a structure element in morphology processing, said second signal processing including multiplying pixel values of a plurality of pixels within the mask area by a second group of weighting factors set depending on positions within the mask area, respectively, and converting a pixel value at a center of the mask area into a minimum value of the pixel values multiplied by the second group of weighting factors; and
wherein said first and second groups of weighting factors are set such that a value obtained by multiplying corresponding factors within the mask area in said first and second groups together becomes 1.

9. The ultrasonic image processing method according to claim 8, wherein:
said first group of weighting factors are set smaller according as the positions are apart from the center of the mask area; and
said second group of weighting factors are set larger according as the positions are apart from the center of the mask area.

10. The ultrasonic image processing method according to claim 8, wherein said first and second groups of weighting factors are set based on a frequency of ultrasonic waves to be transmitted.

11. The ultrasonic image processing method according to claim 8, wherein said first and second groups of weighting factors are set based on a depth of the object represented in the ultrasonic image.

12. The ultrasonic image processing method according to claim 8, wherein said first and second groups of weighting factors are set based on a target part of observation.

13. An ultrasonic image processing program, embodied in non-transitory form on a computer readable medium, for processing a plurality of signals obtained by scanning an object to be inspected with an ultrasonic beam and respectively representing pixel values of a plurality of pixels within an ultrasonic image, said program allowing a CPU to execute the procedures of:
(a) processing the plurality of signals to reduce speckles appearing in the ultrasonic image; and
(b) converting a scan format of the plurality of signals processed at procedure (a);
wherein procedure (a) includes (i) performing first signal processing on the plurality of signals while moving a mask area determined based on a structure element in morphology processing, said first signal processing including multiplying pixel values of a plurality of pixels within the mask area by a first group of weighting factors set depending on positions within the mask area, respectively, and converting a pixel value at a center of the mask area into a maximum value of the pixel values multiplied by the first group of weighting factors, and (ii) performing second signal processing on the plurality of signals subjected to the first signal processing while moving a mask area determined based on a structure element in morphology processing, said second signal processing including multiplying pixel values of a plurality of pixels within the mask area by a second group of weighting factors set depending on positions within the mask area, respectively, and converting a pixel value at a center of the mask area into a minimum value of the pixel values multiplied by the second group of weighting factors; and
wherein said first and second groups of weighting factors are set such that a value obtained by multiplying corresponding factors within the mask area in said first and second groups together becomes 1.

14. The ultrasonic image processing program according to claim 13, wherein:
said first group of weighting factors are set smaller according as the positions are apart from the center of the mask area; and
said second group of weighting factors are set larger according as the positions are apart from the center of the mask area.

15. The ultrasonic image processing program according to claim 13, wherein said first and second groups of weighting factors are set based on a frequency of ultrasonic waves to be transmitted.

16. The ultrasonic image processing program according to claim 13, wherein said first and second groups of weighting factors are set based on a depth of the object represented in the ultrasonic image.

17. The ultrasonic image processing program according to claim 13, wherein said first and second groups of weighting factors are set based on a target part of observation.

* * * * *